United States Patent
Eberstein

(10) Patent No.: US 12,008,597 B2
(45) Date of Patent: *Jun. 11, 2024

(54) SYSTEMS AND METHODS FOR DETECTING A PEAK IN WEB TRAFFIC ON AN ELECTRONIC NETWORK

(71) Applicant: Yahoo Ad Tech LLC, Dulles, VA (US)

(72) Inventor: Mark Eberstein, Marina del Ray, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,057

(22) Filed: Nov. 30, 2022

(65) Prior Publication Data

US 2023/0103048 A1    Mar. 30, 2023

Related U.S. Application Data

(63) Continuation of application No. 16/670,144, filed on Oct. 31, 2019, now Pat. No. 11,544,738, which is a continuation of application No. 14/610,796, filed on Jan. 30, 2015, now Pat. No. 10,497,021.

(51) Int. Cl.
   *G06Q 30/0242*    (2023.01)
(52) U.S. Cl.
   CPC ..... *G06Q 30/0246* (2013.01); *G06Q 30/0242* (2013.01)
(58) Field of Classification Search
   None
   See application file for complete search history.

(56) References Cited

U.S. PATENT DOCUMENTS

| | | | |
|---|---|---|---|
| 6,480,812 B1 | 11/2002 | Wada et al. | |
| 7,668,946 B1* | 2/2010 | Garcia-Franco | G06Q 30/02 709/224 |
| 2007/0033122 A1 | 2/2007 | Cagan | |
| 2007/0055477 A1* | 3/2007 | Chickering | G06Q 30/02 702/182 |
| 2009/0006145 A1 | 1/2009 | Duggal et al. | |
| 2015/0341684 A1* | 11/2015 | Kitts | H04N 21/812 725/14 |
| 2016/0162973 A1 | 6/2016 | Lee et al. | |

OTHER PUBLICATIONS

D. Cygnis Media Editor, "What is Digital Attribution", available on Dec. 17, 2014, retrieved from https://www.cygnismedia.com/blog/digital-attribution-model/ (Year: 2014).*
Cygnis Media Editor, "What is Digital Attribution", available on Dec. 17, 2014, retrieved from https://www.cygnismedia.com/blog/digital-attribution-model/.
Interactive Mathematics (IntMath), Proof of the Perpendicular Distance Formula, May 24, 2013, pp. 4-7.

* cited by examiner

*Primary Examiner* — Sam Refai
(74) *Attorney, Agent, or Firm* — Bookoff McAndrews, PLLC

(57) ABSTRACT

Systems and methods are disclosed for attributing web traffic to an advertising spot. The method may include receiving traffic data for a web page from a server associated with an advertiser and receiving, from a log provider, a log of a plurality of advertising spots related to the advertiser. A duration of time as a peak may be designated to identify the amount of traffic that is attributable to the one of the plurality of advertising spots.

20 Claims, 15 Drawing Sheets

| SPOT | TIME | COST (DOLLARS/SPOT) | NETWORK | MARKETING CHANNEL | PROGRAM | LENGTH (SECONDS) | AUDIENCE SIZE (MILLIONS) | PURCHASING AGENCY | CREATIVE |
|---|---|---|---|---|---|---|---|---|---|
| 1 | 5:00:00 | 20 | ABC | NATIONAL TELEVISION | GREY'S ANATOMY | 30 | 9.44 | JONES | NEW YORK |
| 2 | 5:16:00 | 10 | NPR | NATIONAL RADIO | CAR TALK | 30 | 1.2 | SMITH | RUNNING |
| 3 | 5:25:00 | 15 | ABC | LOCAL TELEVISION | PETER PAN LIVE | 45 | 2.3 | JOHNSON | MICHAEL JORDAN |
| 4 | 5:47:00 | 17 | CBS | NATIONAL TELEVISION | MOM | 45 | 7.3 | JONES | LEBRON JAMES |
| 5 | 5:50:00 | 12 | USA | LOCAL TELEVISION | COVERT AFFAIRS | 30 | 5.2 | PETERSON | RUNNING |

SYSTEMS AND METHODS FOR DETECTING A PEAK IN WEB TRAFFIC ON AN ELECTRONIC NETWORK

CROSS-REFERENCE TO RELATED APPLICATION(S)

This patent application is a continuation of and claims the benefit of priority to U.S. application Ser. No. 16/670,144, filed on Oct. 31, 2019, which is a continuation of U.S. application Ser. No. 14/610,796, now U.S. Pat. No. 10,497,021, filed on Jan. 30, 2015, the entireties of which are incorporated herein by reference.

TECHNICAL FIELD

The present disclosure relates generally to analyzing online behavior in the context of related advertising spots and, more particularly, to determining how much web traffic is attributable to commercials that aired on television or radio.

BACKGROUND

Advertising spots on TV and radio are key marketing tools used by companies to drive web page traffic and sales. These companies often wish to determine the effect of individual advertising spots on web page traffic and sales. Specifically, for various reasons, it is desirable to measure usage of online network-connected resources, and to attribute portions of such use to offline stimuli, such as TV or radio advertisements.

Accuracy in attributing web traffic and sales to specific advertising spots is important to such companies. However, measuring the effectiveness of TV advertisements is far more challenging than with online ads. Similarly, optimizing ads to a target demographic is far more difficult with TV than with online media. Customers almost always view ads on TV and make purchases (i.e., "conversions") through other channels, including through the Internet.

The most common industry approach for understanding who is viewing TV advertisements is by using viewer panels of volunteer users who allow their activities to be monitored. However, the industry standard Nielsen panel contains only 25,000 users (out of approximately 114.5 million television households), which is less than 0.022% of population.

Aside from the use of the Nielsen panel, other solutions for identifying peaks in web traffic traditionally involved analyzing web traffic as a function of a standard deviation from a local average of traffic volume. For example, in some conventional solutions, a simple threshold technique is used to define all traffic above a threshold value multiplied by the standard deviation from a local average trend line. Unfortunately, both of these local average and standard deviation metrics are easily skewed when there is a spike in traffic. Moreover, this technique only captures the tip of a peak, but fails to identify and attribute the base of the peak in online traffic. Thus, there exists a need for a method to accurately identify and attribute peaks in online traffic to advertising spots.

Further, conventional solutions have no way of attributing a single peak to multiple advertising spots that aired at similar times. Thus, there exists a need for a method to accurately divide peaks in online traffic, and to attribute online traffic and sales between multiple advertising spots that aired at similar times.

SUMMARY OF THE DISCLOSURE

Embodiments disclose systems and methods for attributing web traffic to an advertising spot. Each of the embodiments disclosed herein may include one or more of the features described in connection with any of the other disclosed embodiments.

The present disclosure includes a computer-implemented method for attributing web traffic to an advertising spot. One method includes: receiving traffic data for a web page from a server associated with an advertiser; receiving a log of a plurality of advertising spots related to the advertiser; determining web traffic data during a time period extending at least of one of before and after one of the plurality of advertising spots; determining a variance from a trend line fit to the determined web traffic data; disregarding web traffic data above a value multiplied by the determined variance to calculate a modified variance from the trend line; designating a duration of time as a peak based on the modified variance; and identifying the amount of traffic that is attributable to the one of the plurality of advertising spots as the traffic data above the trend line within the duration of the peak.

According to certain embodiments, systems are for attributing web traffic to an advertising spot. One system includes a memory having processor-readable instructions stored therein; and a processor configured to access the memory and execute the processor-readable instructions, which when executed by the processor configures the processor to perform a method. In an exemplary method, the method includes: receiving traffic data for a web page from a server associated with an advertiser; receiving a log of a plurality of advertising spots related to the advertiser; determining web traffic data during a time period extending at least of one of before and after one of the plurality of advertising spots; determining a variance from a trend line fit to the determined web traffic data; disregarding web traffic data above a value multiplied by the determined variance to calculate a modified variance from the trend line; designating a duration of time as a peak based on the modified variance; and identifying the amount of traffic that is attributable to the one of the plurality of advertising spots as the traffic data above the trend line within the duration of the peak.

According to certain embodiments, a non-transitory computer readable medium is disclosed as storing instructions that, when executed by a computer, cause the computer to perform a method, the method receiving traffic data for a web page from a server associated with an advertiser; receiving a log of a plurality of advertising spots related to the advertiser; determining web traffic data during a time period extending at least of one of before and after one of the plurality of advertising spots; determining a variance from a trend line fit to the determined web traffic data; disregarding web traffic data above a value multiplied by the determined variance to calculate a modified variance from the trend line; designating a duration of time as a peak based on the modified variance; and identifying the amount of traffic that is attributable to the one of the plurality of advertising spots as the traffic data above the trend line within the duration of the peak.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 is an exemplary log of advertising spots, according to some embodiments;

DESCRIPTION OF THE EMBODIMENTS

Figure 1:
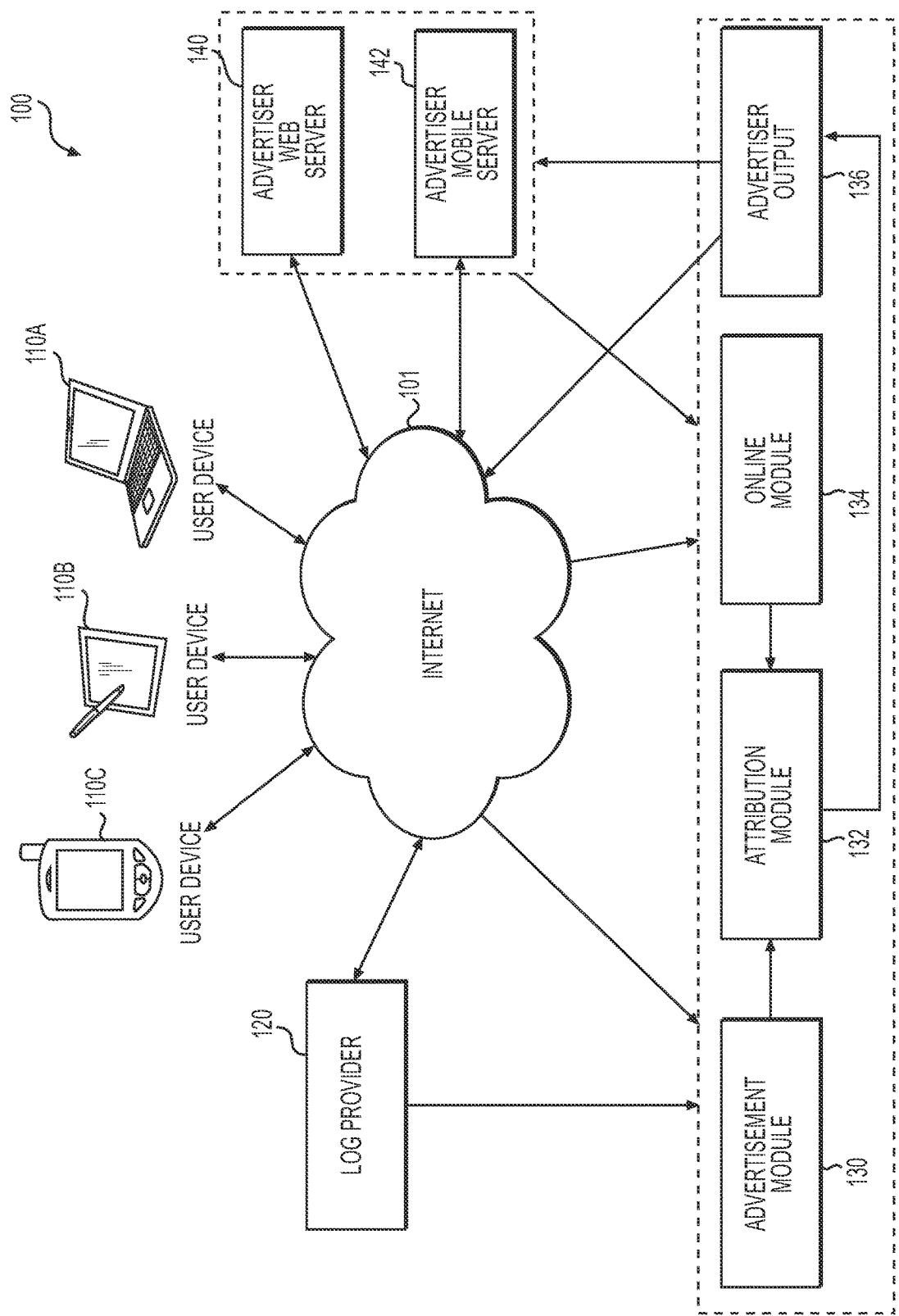
FIG. 1 is a block diagram of an exemplary communication system suitable for practicing an embodiment of the present disclosure.

As described above, conventional solutions for attributing web traffic to advertising spots often provided inaccurate and/or skewed results. The present disclosure is directed to overcoming these issues. Specifically, the present disclosure is directed to more accurately detecting peaks in online traffic, and to attributing online traffic and sales to individual advertising spots. Increased accuracy may be obtained by using iterative techniques to fit a line to the true trend in web traffic data, and to quantify the noise in the data. Increased accuracy may also be obtained by using an advanced thresholding technique to capture the entire peak instead of just the tip of the peak.

The disclosure further relates to determining how to attribute some fraction of a peak in web traffic to each of multiple advertising spots that aired at similar times (i.e., in circumstances where the usual time-based indicators are less useful). According to embodiments of the present disclosure, one or more of various quantitative values associated with an advertising spot may be used to attribute portions of a traffic peak to each of the plurality of advertising spots. Specifically, in some embodiments, the cost to air the advertising spot may be used as a weighting factor for calculating the portion of web traffic to attribute to an advertising spot. For example, portions of web traffic may be attributed to one or more concurrent advertising spots based on each spot's relative "weight," and a fractional credit as a function of the cost per lead of a marketing channel on which the spot is aired. Thus, the size of a peak in online traffic may be correlated with the cost of the advertising spot of interest.

As used herein, the terms "TV ad spot," "advertising spot," or simply "spot" may refer to a single airing of a single advertisement item (e.g., a television advertisement, television commercial, news program, radio ad, radio program, radio news piece, or other broadcast item to be tracked) on a particular station at a particular time, and possibly in a particular geographic region (e.g., time zone, zip code or DMA). In some embodiments, a log of a plurality of aired advertising spots, including at least one specific single advertising spot, may be stored in a database. Each log may include additional information, such as a television network on which the spot was aired, a network type (e.g., "news network," "broadcast network," "cable network"), a time at which the spot aired, a time zone in which the spot was aired, a television program during which the spot was aired, a marketing channel associated with the spot, an indication of whether the spot was paid (such as a paid advertisement) or unpaid (such as coverage by a news program), a time length of the spot, a rating size of a viewing audience, a linking key, etc. As will become apparent to the skilled artisan, a nearly infinite variety of metadata may be associated with any given spot.

Additionally, television ratings data, such as data gathered by the ratings firm Nielsen Company, may be stored in each spot's log. Using data from the Nielsen Company or others, a spot may be associated with various items of meta-data providing further information about the spot. For example, such metadata may include a number of gross impressions (i.e., an estimated total number of television viewers to whom the spot was shown), a ratings share value (i.e., the percent of TV-equipped households in a particular geographic region), information describing the demographic breakdown of the likely viewers of a spot, or other quantitative or qualitative ratings information about a spot or likely viewers of a spot.

At least one exemplary method consistent with the present disclosure will now be described. Specifically, in one embodiment of the present disclosure, web traffic of interest may be placed into groups or "bins" of a discrete duration, such as minute-long bins. By way of background, after analyzing significant data across several advertisers and across several different product niches, it may have been determined that a spike/peak in traffic is, typically, at most a few minutes long following the airing of an advertising spot. Further, though daily traffic volume is typically not constant, and varies throughout the day, it does not necessarily change quickly. Therefore, it may be possible to accurately model the average traffic at any part of the day by a trend line informed by traffic within the minute-long bins that occur both before and after the time of an advertising spot of interest.

One problem of attributing web traffic to particular advertising spots involves identifying the trend in the web traffic notwithstanding traffic driven solely by the advertising spot of interest. In other words, it may be difficult to identify the trend line that would have existed had the advertising spot not aired. For example, it may be challenging to identify a trend in web traffic by fitting a line to the web traffic data when the data has large spikes or peaks. However, based on the previously mentioned data observations, it may sometimes be assumed that the width of the spike may not be very large (in other words, the duration of the spike may not be very long). Therefore, in one embodiment of the present disclosure, a trend line may be fit to, for example, about 90 minutes of data, including, e.g., 30 minutes before an advertising spot airs and continuing to, e.g., 60 minutes after the advertising spot airs. In this way, most of the data may be unrelated to the spike and will help a line fitting routine fit a line to the true trend instead of being skewed by the spike.

In one embodiment of the present disclosure, before the line fitting routine is run, some points that are relatively far from the median may be filtered out or "disregarded" to prevent very large spikes from skewing the fit. In some embodiments, small spikes may not necessarily be filtered out, since they may be too small to negatively impact an overall trend. Of course, it should be appreciated that any duration of times before and/or after the advertising spot may be used to generate an initial trend line, such as anywhere from several hours, to an hour, to just a few minutes before the spot, and anywhere from several hours, to an hour, to just a few minutes after the spot.

Once a trend line is fit to web traffic data of interest, it may be determined whether each of one or more points in the data is identifiable as part of a spot-caused spike in the data. To do this, it may be determined whether a point in the data is outside some threshold from the trend line, e.g., above a value multiplied by a standard deviation above the trend line. In some embodiments, an iterative variance may be used, where, e.g., when an iterative standard deviation is used, points outside of the standard deviation (or a multiplier times the standard deviation) may be discarded, and then the standard deviation may be recalculated as the modified standard deviation. In this way, spikes do not necessarily (or at least do not greatly) skew the modified standard deviation. In some embodiments, a distance between a given point and the trend line may be calculated as the orthogonal distance from the trend line to the point, as opposed to the vertical distance from the line to the point.

In some embodiments, it may then be determined which points are "part of," or attributable to, the spike. In one embodiment, a threshold may be used, e.g., to determine whether the point is greater than a value multiplied by a variance (e.g., standard deviation) from the trend line. Since this technique may capture primarily the tip of the peak versus the base, in another embodiment, a Schmitt trigger may be used to identify points that are part of the peak. In one embodiment, the upper threshold of the Schmitt trigger may be, e.g., 3.5 multiplied by the variance and the lower threshold may be, e.g., 1 multiplied by the variance. In this way, a majority of the spike may be captured. In total, iterative techniques may be used to conduct a line fitting and to calculate the standard deviation of the noise in the data. A Schmitt trigger may then be used to determine which points in the data are related to the spike and which points are related to the natural traffic.

Once it is determined that a spike exists, the next step may be to calculate how much of the traffic is related to the spike. In one embodiment, the area above the trend line for all spike points can be attributed to the peak, because the trend line is fitting the average (i.e., half of the points in the trend will be above the line and half the points will be below the line). Thus, these and other methods disclosed herein may enable highly accurate identification of web traffic attributable to a given advertising spot.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a block diagram of an exemplary communications environment 100 for practicing embodiments of the present disclosure. As shown in FIG. 1, environment 100 may include user devices 110A, 1106, and 110C, log provider 120, advertisement module 130, attribution module 132, online module 134, advertiser output 136, advertiser web server 140, and advertiser mobile server 142, all of which may be communicatively coupled directly and/or via the Internet 101.

While only user devices 110A, 1106, and 110C are shown in FIG. 1, environment 100 may include any number of user devices. Similarly, while only log provider 120, advertisement module 130, attribution module 132, online module 134, advertiser output 136, advertiser web server 140, and advertiser mobile server 142 are shown in FIG. 1, it should be understood that environment 100 may include additional or fewer servers, modules, providers, outputs, etc. as desired for a particular implementation.

Internet 101 may be any type of electronic network or combination of networks used for communicating digital content and data between various computing devices. Internet 101 may include, for example, a local area network, a medium area network, or a wide area network.

Each of advertisement module 130, attribution module 132, online module 134, advertiser output 136, advertiser web server 140, and/or advertiser mobile server 142 may be, or may be performed on, any of various types of servers including, but not limited to, a web server, a proxy server, a network server, or other type of server configured to exchange electronic information with other servers or computing devices via a communication network, e.g., the Internet 101. Such a server may be implemented using a computer capable of serving data to other computing devices including, but not limited to, user devices 110A, 1106, and 110C or any other computing device (not shown) via the Internet 101. Such a server may include, for example and without limitation, a processor, and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory, and graphical user interface display. The server may also be implemented using multiple processors and multiple shared or separate memory devices within, for example, a clustered computing environment, or server farm.

As shown in FIG. 1, advertisement module 130, attribution module 132, online module 134, and advertiser output 136 may all be performed by one party (e.g., the attribution company) or under the direction of one party (e.g., an attribution system and/or server). In some embodiments, any or all of these may be performed by different parties and/or servers. For example, in some embodiments, online module 134 may be controlled by a separate server or system (e.g., advertiser web server 140 and/or advertiser mobile server 142).

As shown in FIG. 1, advertiser web server 140 and/or advertiser mobile server 142 may be owned and/or operated by a single entity (e.g., the advertising company). For example, the single entity may be the entity that desires to know, and hires an attribution company to find out, what percentage of its various spikes in site traffic and/or web purchases are attributable to TV and/or radio spots that it purchases. Similarly, as shown in FIG. 1, log provider 120 may be a separate party. A log provider may be, for example, an advertising agency buying advertising spots, the marketing channels airing the spots (e.g., television networks, radio stations, etc.), the advertising company, etc. In some embodiments, log provider 120 may be performed by the attribution company (e.g., advertisement module 130 may track advertisement spots) or by the advertiser itself.

In the example shown in FIG. 1, user device 110A may be a laptop, notebook, netbook, or similar type of mobile computing device. User device 110B may be, for example, a tablet device or similar type of user device having a touch-screen display. User device 110C may be, for example, a mobile handset, smartphone, or personal digital assistant ("PDA"). However, it should be noted that each of user devices 110A, 110B, and 110C may be any type of mobile computing device configured to send and receive different types of data including, but not limited to, website data, multimedia content, electronic advertisements, and any other type of digital information, over Internet 101. Examples of such user computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

User devices 110A, 110B, and 110C (often numbering in the hundreds, thousands or millions of user-controlled devices) may send data to advertiser web server 140 and/or advertiser mobile server 142, and may receive data from advertiser web server 140 and/or advertiser mobile server 142.

For example, advertiser web server 140 and/or advertiser mobile server 142 may be configured to host a web service that provides users with various types of functionality via a GUI of the client application or a web page executable at each of user devices 110A, 110B, and 110C. Such functionality may include, for example and without limitation, providing digital content distributed by an advertiser, online shopping and shopping carts, online product configurators, and so on. Advertiser web server 140 and/or advertiser mobile server 142 may be configured to receive data about events from user devices 110A, 110B, and 110C via Internet 101. In one embodiment, advertiser web server 140 and/or advertiser mobile server 142 may be implemented as real time exchange (or "RTX") integration systems that collect pixel tracking events received from user devices 110A, 110B and 110C, and forwards data about these events to online module 134.

When a user visits a web page or uses a client application, data may be collected via beacons, pixels, or other traffic tracking devices. Examples of such pixels may include, but are not limited to, click pixels, conversion pixels, and/or view pixels. These pixels may collect information about the user and/or user's actions and pass it back to a server (e.g., advertiser web server 140, advertiser mobile server 142, and/or online module 134). Each web page visit, click, purchase, membership sign up, and other unit of activity may be considered an "event." Such user interactions may be performed via a web browser, a web application, a mobile device application, a desktop application, or any other mechanism. In some embodiments, a "visit" or a "visit event" may be an individual request (e.g., an individual GET request from a particular device to a particular URL). In other embodiments, a visit may be a collection of requests received within a particular span of time. For example, within one browsing session, a user's device may send dozens, hundreds, or even thousands of requests, even if the browsing session only lasts for a few minutes. Nonetheless, an entire browsing session may be recorded as a single "visit" for the purposes of some embodiments herein. These events may be transmitted to advertiser web server 140 and/or advertiser mobile server 142. For example, the advertising retailer may track and store on its web server the event of visits to www.retailer.com.

The actions of user devices 110A, 110B, and/or 110C (e.g., visiting the advertiser's web page(s), purchasing from an advertisers web page(s), etc.) may be provided to advertiser web server 140 and/or advertiser mobile server 142 via Internet 101. For example, advertiser web server 140 and/or advertiser mobile server 142 may also include an event tracking engine. An event tracking engine may be configured to recognize and identify events and to track any or all visit, use, or conversion activities performed by user devices 110A, 110B, and 110C. Some embodiments of an event tracking engine may be configured to identify and recognize specific activities as being conversions (e.g., purchases) or other activities to be tracked.

For example, sophisticated client-server software systems allow users to perform transactions such as purchasing goods or services within web page(s). In some cases, such purchases may occur in one-time transactions or as one or more up-sells (e.g., a premium add-on service). Other types of transactions might involve subscribing to a service, making a reservation, signing up for an account, signing up to receive more information, providing personal information, sending or retrieving a message, navigating through a sequence of web pages to obtain desired content, performing searches for user specified information, and so forth. Depending upon the purpose of the network location, any of these or other activities may be defined as a "conversion."

Advertiser web server 140 and advertiser mobile server 142 may be configured to communicate all events that occur on advertiser's web page(s) and client applications to the attribution system (e.g., via online module 134). In some embodiments, only some of the events data may be forwarded to online module 134. For example, an advertiser may wish that an analysis be performed only on purchases that can be attributed to an advertising spot. In such an embodiment, advertiser web server 140 and advertiser mobile server 142 may filter out any event data related to visits and only forward purchasing events to online module 134. In some implementations, an advertiser may wish to weigh events differently. For example, a purchasing event may be afforded more weight than a visit. Events may be assigned weights in any server/module, including but not limited to, attribution module 132, online module 134, advertiser web server 140, and/or advertiser mobile server 142. The aggregate of some or all of these events or the resultant data after the events have been weighed, may be considered the traffic data for the advertiser's web page(s) and/or client application.

The traffic data may be provided directly from advertiser web server 140 and/or advertiser mobile server 142 to online module 134 or may be transmitted through the Internet 101 to online module 134. The traffic data may be provided at any time, including but not limited to, hourly, daily, weekly, etc., or in real-time. In some embodiments, traffic data may be provided based on quantity. For example, traffic data may be provided to the online module 134 once a web page receives a threshold number of new visitors or periodically.

Once traffic data is received, online module 134 may place the traffic into discrete (e.g., minute-long) bins, creating a graphical representation of traffic to a web page versus time. From there, online module 134 may perform attribution calculations on the data itself or may forward the weighed and/or plotted traffic data to attribution module 132 for further analysis.

As described above, once traffic data is received, online module 134 may place the traffic into groups or bins of a certain duration, such as into minute-long bins. Online module 134 may also create an electronic and/or graphical representation of traffic to a web page versus time, each data point of traffic being placed into one of the defined bins of time. Online module 134 may also perform attribution calculations on the data itself or may forward the weighed and/or plotted traffic data to attribution module 132 for further analysis.

Log provider 120 may provide the attribution system with information about offline advertisement airings, such as in a historical log of advertising spots. In some embodiments, the log may include data related to some or all advertising spots purchased by a given advertising company. For example, a retailer or the retailer's advertising agency may provide a log of a plurality of the retailer's TV and/or radio advertisements or "spots." The log may include any information related to the advertising spots, including, but not limited to, which agency purchased the advertisement spot, the network that ran the spot, the program the spot ran during, the time the spot ran, the length of the spot, the cost of the spot, the audience size that viewed the program that the spot ran during, the creative aspect(s) of the advertising spot, and/or the market the spot ran in (e.g., national television, local television, radio, etc.).

In the example shown in FIG. 1, the log provider 120 may provide one or more logs to the advertisement module 130. The log may be provided directly from log provider 120 to advertisement module 130 or may be transmitted through the Internet 101 to advertisement module 130.

As described further with respect to FIGS. 2 and 3A-G, attribution module 132 may receive log data from advertisement module 130 and/or log provider 120, and receive web page traffic data from online module 134 and/or the advertiser. Attribution module 132 may perform a variety of calculations to designate certain traffic as attributable (or likely attributable) to each of the advertising spots, by using the log data related to a specific advertiser's advertising spots and web page traffic data from the advertiser's web page(s) and/or client applications.

Once these calculations are complete, the results including, but not limited to, the traffic attributable to each advertising spots, may be transmitted from attribution module 132 to advertiser output 136 for transmission or display to the advertiser. This output may be communicated to the advertiser by transmitting the results to advertiser web server 140 and advertiser mobile server 142 directly, or via the Internet 101.

As described further with respect to FIGS. 4-8, attribution module 132 may receive both (i) information and/or data regarding television commercial airings, and (ii) information and/or data regarding online traffic to websites affiliated with a product, service, and/or company sponsoring those television commercial airings. Using that log data of an advertiser's advertising spots and web page traffic data from the advertiser's web page(s) and/or client applications, attribution module 132 may then perform a variety of calculations to credit fractions of peaks in web traffic to each of several similarly timed advertising spots and accurately attribute the additional traffic caused by each of these spots.

Once these calculations are complete, the results including, but not limited to, the traffic attributable to each advertising spot of the plurality of advertising spots that ran at similar times may be transmitted from attribution module 132 and communicated via advertiser output 136. This output may be communicated to the advertiser by transmitting the results to advertiser web server 140 and advertiser mobile server 142 directly, or via the Internet 101.

Figure 2:
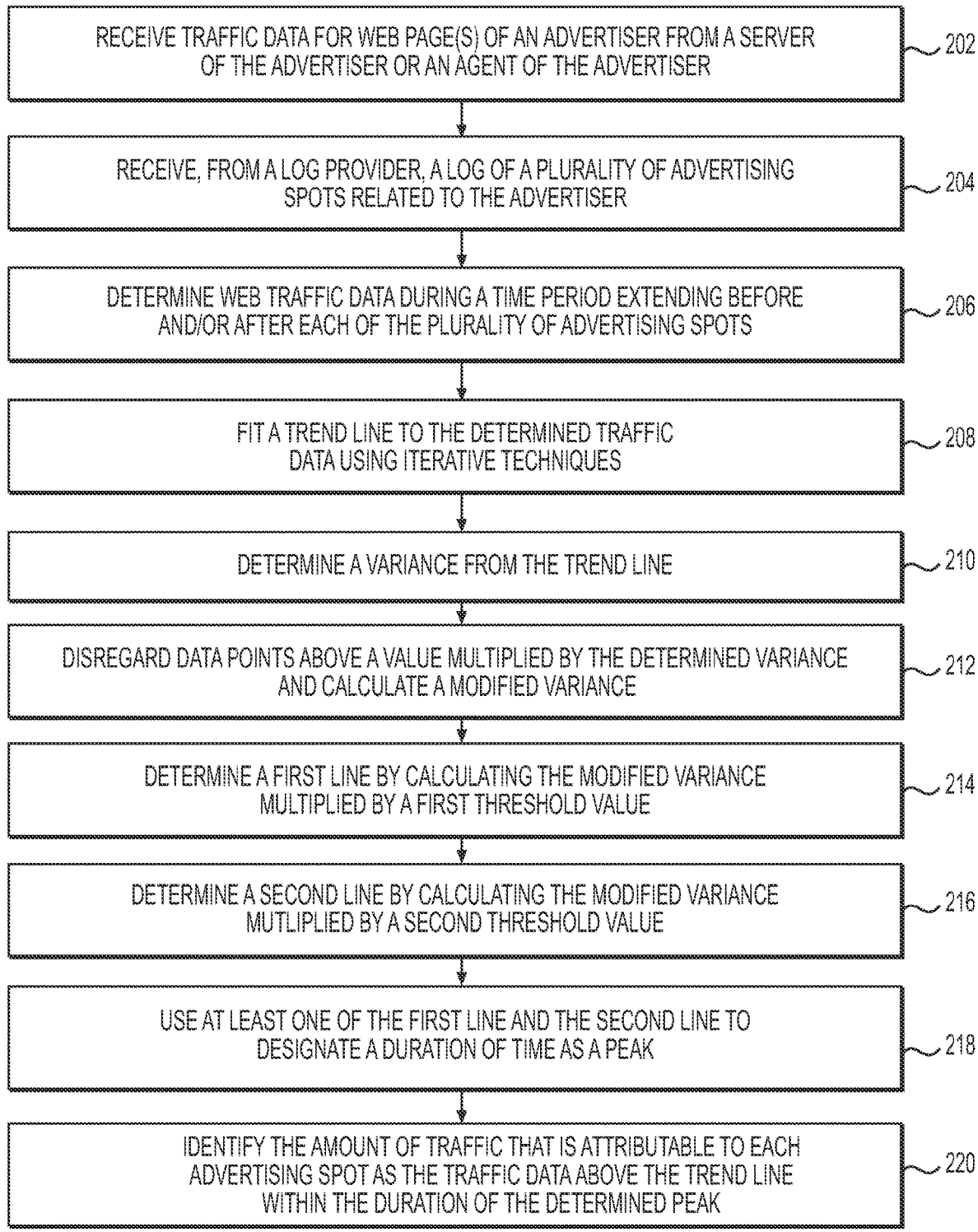
FIG. 2 is a block diagram of an exemplary process for identifying an amount of web page traffic attributable to each of several advertising spots.

FIG. 2 is a process flow diagram of an exemplary method 200 for attributing web traffic to an advertising spot. For purposes of discussion, method 200 will be described with respect to environment 100 of FIG. 1, as described above, and the graphical representations of FIGS. 3A-G, as described below, but method 200 is not intended to be limited thereto. As shown in FIG. 2, method 200 may include steps 202, 204, 206, 208, 210, 212, 214, 216, 218, and 220. However, it should be noted that method 200 may include more or fewer steps as desired for a particular implementation, and the steps may be performed in any order. For example, one or more of the above-listed steps of method 200 may be executed by advertisement module 130, attribution module 132, and/or online module 134 of FIG. 1, as described above. However, method 200 is not intended to be limited thereto, and the steps of method 200 may be performed by any party, module, and/or server (e.g., log provider 120, advertiser web server 140, and/or advertiser mobile server 142) or any other type of computing device having at least one processor, a memory, and a network communication interface for sending and receiving information from one or more user devices.

Method 200 may begin in step 202, which may include receiving traffic data for web page(s) of an advertiser from a server of the advertiser or an agent of the advertiser. For example, in FIG. 1, online module 134 may receive traffic data for an advertiser's web page(s) and/or client applications from advertiser web server 140 and/or advertiser mobile server 142. Step 204 may include receiving, e.g., from a log provider, a log of a plurality of advertising spots related to the advertiser (e.g., advertisement module 130 may receive a log from log provider 120 of FIG. 1). The log may include any information related to the advertising spots, including, but not limited to, which agency purchased the advertisement spot, the network that ran the spot, the program the spot ran during, the time the spot ran, the length of the spot, the cost of the spot, the audience size that viewed the program that the spot ran during, and/or the market the spot ran in (e.g., national television, local television, radio, etc.). In some embodiments, advertisement module 130 may track advertising spots and create a log itself.

In the example shown in FIG. 1, online module 134 and advertisement module 130 may provide to attribution module 132 data related to traffic on the advertiser's web page(s) and data related to a plurality of advertising spots, respectively. In step 206, attribution module 132 may determine web traffic data during a time period extending before (e.g., a baseline period) and/or after (e.g., a measurement period) each of the plurality of advertising spots.

Figure 3A:
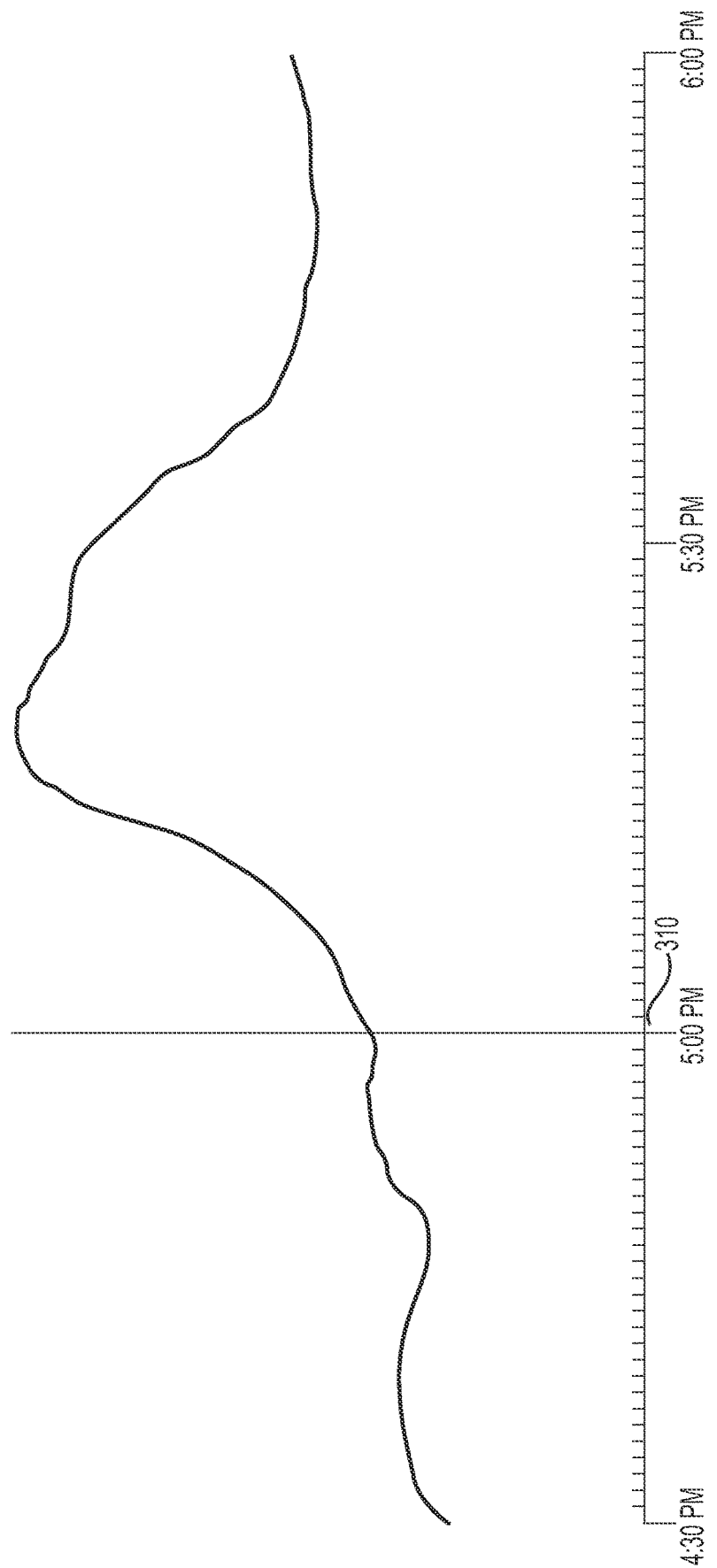
FIGS. 3A-3G are graphs of a number of visitors to a network location over time, illustrating a baseline time period and a measurement time period for evaluating the effectiveness of offline advertisements in driving online activity, according to some embodiments.

As shown in FIG. 3A, attribution module 132 may generate a graphical representation of the time before and/or after advertising spot 310 airs on television and/or the radio, such as, for example, the time period extending between 30 minutes preceding the spot airing and 60 minutes following the spot airing. In some embodiments, each point on the graph may represent the number of visitors, views, new visitors, new member sign ups, and/or purchases in a minute, and of course may be scaled by any desired metric or unit.

As shown in FIG. 3A, advertising spot 310 ran at 5:00 μm, and traffic to the advertiser's web page(s) is plotted within the 30 minutes preceding the spot (i.e., "baseline period") and 60 minutes following the spot (i.e., "measurement period"), thereby defining an entire period of interest from 4:30 p.m. to 6:00 pm (with each tick on the x-axis representing a minute). Because the width of a peak in traffic due to an advertising spot is typically not very long, this exemplary 90 minute window may be sufficient to fit a trend line to the traffic data. By starting 30 minutes before the spot airs and continuing 60 minutes after the spot airs, most of the analyzed traffic data is not necessarily related to the peak, which may help the line fitting routine fit to the true trend instead of being skewed by the peak.

It should be appreciated that the preceding baseline period and the following measurement period may each be any length of time. For example, the baseline period may be the same length as the measurement period. The baseline and measurement periods may, in some embodiments, be between a minute and a week long. In some embodiments, the measurement period may be defined to be a sufficient length of time after the start of the advertisement spot that an entire increase in user events relative to the baseline may be reasonably attributed to an advertising spot. Such a time period may vary depending on factors such as spot frequency, spot length, or other factors. In some embodiments, a lower spot frequency may involve a longer measurement window (e.g., up to 1.5 hours, or longer). In some embodiments, the measurement period may be anywhere between about five minutes and about three hours. In other embodiments, the measurement period may be between about 15 minutes and about 1.5 hours. In other embodiments, a measurement period may be defined based on an end time of a spot. For example, in some embodiments, a measurement window may extend from about 15 minutes to about 1.5 hours after the end time of a spot. In other embodiments, a long-term measurement may be made using baseline and measurement periods of weeks or months.

In various embodiments, the length of the baseline and measurement periods may be determined manually, such as by empirical observation of results. In such embodiments, the length of a baseline and/or measurement period may be selected based on an analysis of traffic to the site for which actions are to be tracked. Depending on the frequency of visits to the site, a shorter or greater time period may be used in order to collect a statistically significant number of visits to use as a baseline, and from which to calculate a peak. Thus, an analysis of visit traffic to the site may be performed in order to determine the length of a baseline and/or measurement period during which a sufficient number of visits are likely to be seen. In other embodiments, any other method for determining the lengths of the baseline and measurement periods may also be used.

In some cases, advertisement spots may run close enough together that the measurement period of a first (earlier) spot overlaps a measurement period of a second (later) spot. In some embodiments of such cases, each selected event may be attributed to the advertising spot with a start time closest to the time at which the event occurred. In other embodiments of such cases, selected events occurring during the overlapping time period may be attributed exclusively to the earlier advertising spot or to the later advertising spot. In still further embodiments, some or all events received during such overlapping time periods may remain un-attributed.

In some embodiments, adjustments may need to be made to account for time zone differences. For example, an attribution system may operate using a convention of Eastern Standard Time (EST), while advertising spots may be aired in different regions of the country at different times. For example, a scheduled advertising spot may be broadcast at the same local hour in multiple time zones. In other cases, an advertising spot may transmitted during a live broadcast and thus be broadcast simultaneously in all time zones. For example, a live broadcast transmitted at 8:00 PM EST would be broadcast in California at 5:00 PM PST.

In some cases, a number of events received during a measurement period may be less than the number of events received during a corresponding baseline period. In such situations, the resulting peak may simply be set to zero, meaning that no events need be attributed to the advertising spot. In other words, a negative peak quantity may be normalized to zero.

After the completion of step 206, method 200 may then proceed to step 208. In step 208, a trend line may be fit to the determined traffic data using iterative techniques. Though daily traffic volume to typical web page(s) varies throughout the day, the changes are often gradual. As a result, the average traffic for a specific web page may be accurately modeled at any part of the day by a line.

Figure 3B:
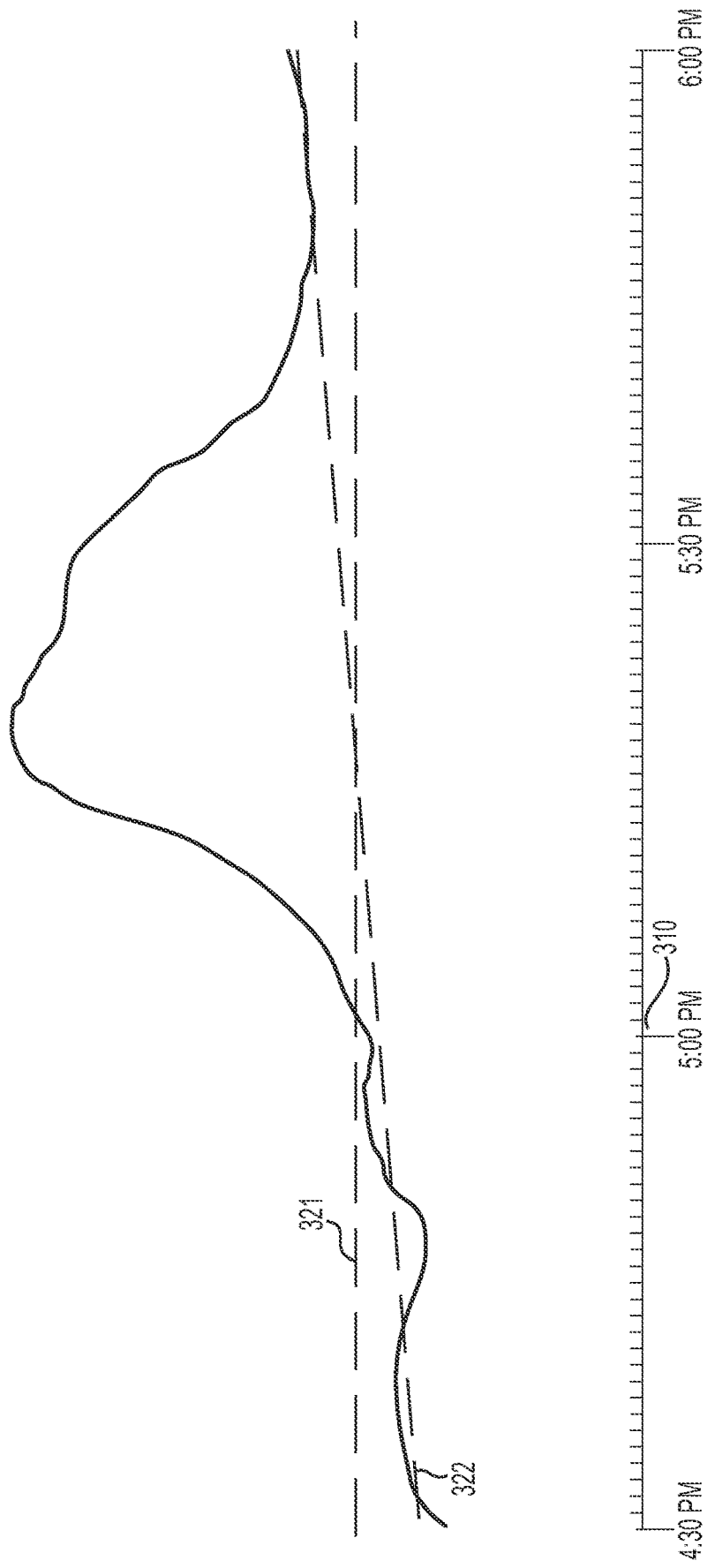

Iterative techniques may be used to fit a line to the true trend in the data and may quantify the noise in the data. In some embodiments, prior to running a line fitting routine, points that are far from the median may be filtered to prevent extremely large spikes from skewing the fit. In some embodiments, a trend line may be the average for the entire time period of determined in step 206. In such embodiments, the trend line may be parallel to the x-axis (e.g., trend line 321 of FIG. 3B) In some embodiments, the trend line may be repeatedly recalculated over 90 minutes (e.g., every 10 seconds, minute, 5 minutes, etc.). This may result in a sloped trend line (e.g. trend line 322 of FIG. 3B). The sloped trend line 322 may result in more accurate determinations of traffic attributable to an advertising spot. For example, as shown in FIG. 3B, web traffic may naturally increase from 4:30 p.m. to 6:00 p.m. as consumers leave work. This increase may occur regardless of an advertising spot running. Taking the average of the full 90 minutes to create trend line 321 may skew the results and may incorrectly attribute some the natural increase in traffic to the advertising spot. Similarly, as shown on the left side of the graphical representation, taking the average to create trend line 321, may result in traffic (that may be actually be a result of advertising spot 310) not being attributed to advertising spot 310 as the trend line 321 at 5:00 p.m. is skewed higher because of the natural increase at 6:00 pm.

Figure 3C:
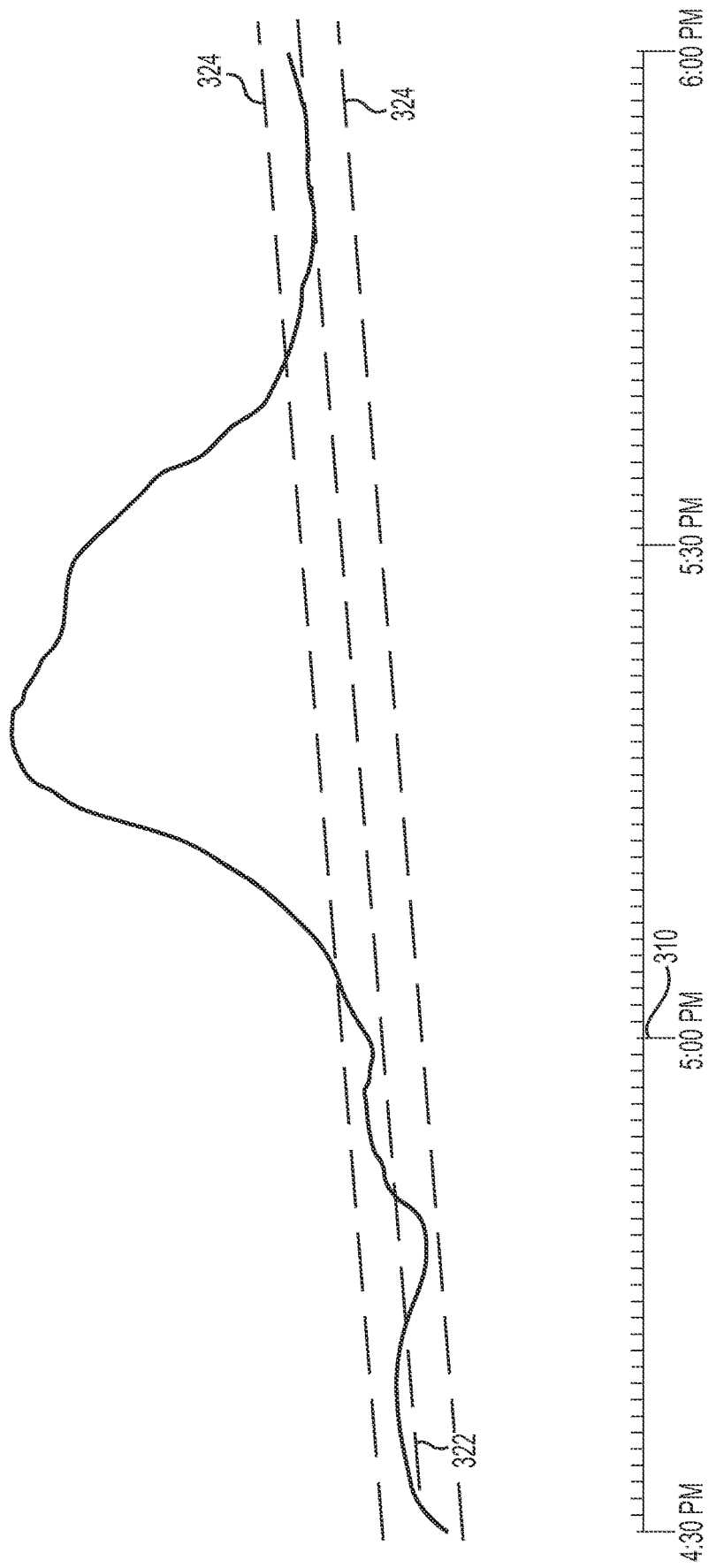
Figure 3D:
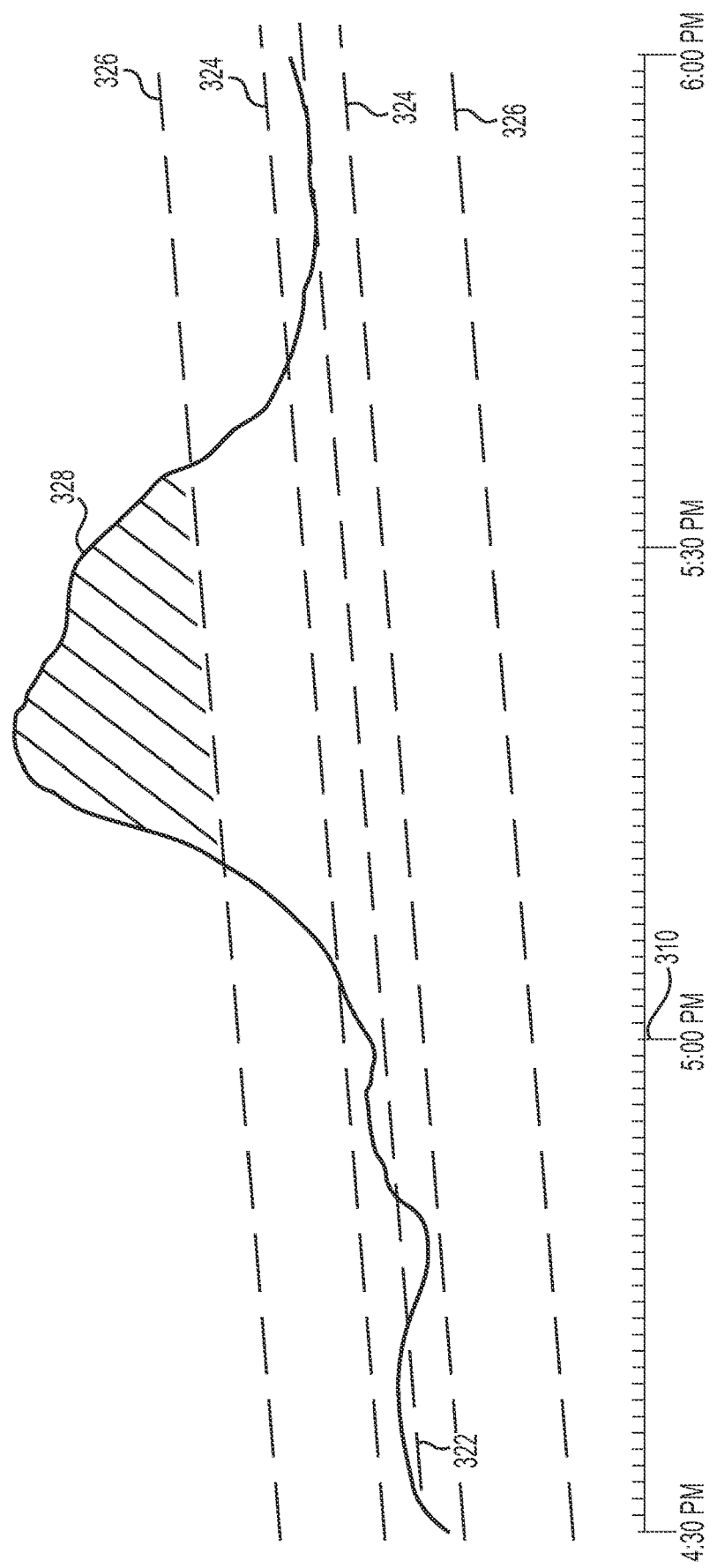

Once a line is fit to the trend in the data, a point in the data may be identified as being part of a peak in the data (i.e., as being caused by a particular spot). In some embodiments, this may be achieved by determining whether a point in the data is above or below a threshold value multiplied by the variance from the trend line. In some embodiments, once trend line 322 is fit for the traffic data before and/or after the airing of advertising spot 310, method 200 may proceed to step 210. In step 210, a variance (e.g., a standard deviation) from the trend line may be determined. For example, attribution module 132 may determine the variance line 324 above and below trend line 322, as illustrated in FIG. 3C. In step 212, data points above a value multiplied by the determined variance may be disregarded. As shown in FIG.

3D, the traffic within area 328 may be disregarded because it is above 3.5 multiplied by (e.g., line 326) the variance (e.g., variance line 324) from trend line 322.

Figure 3E:
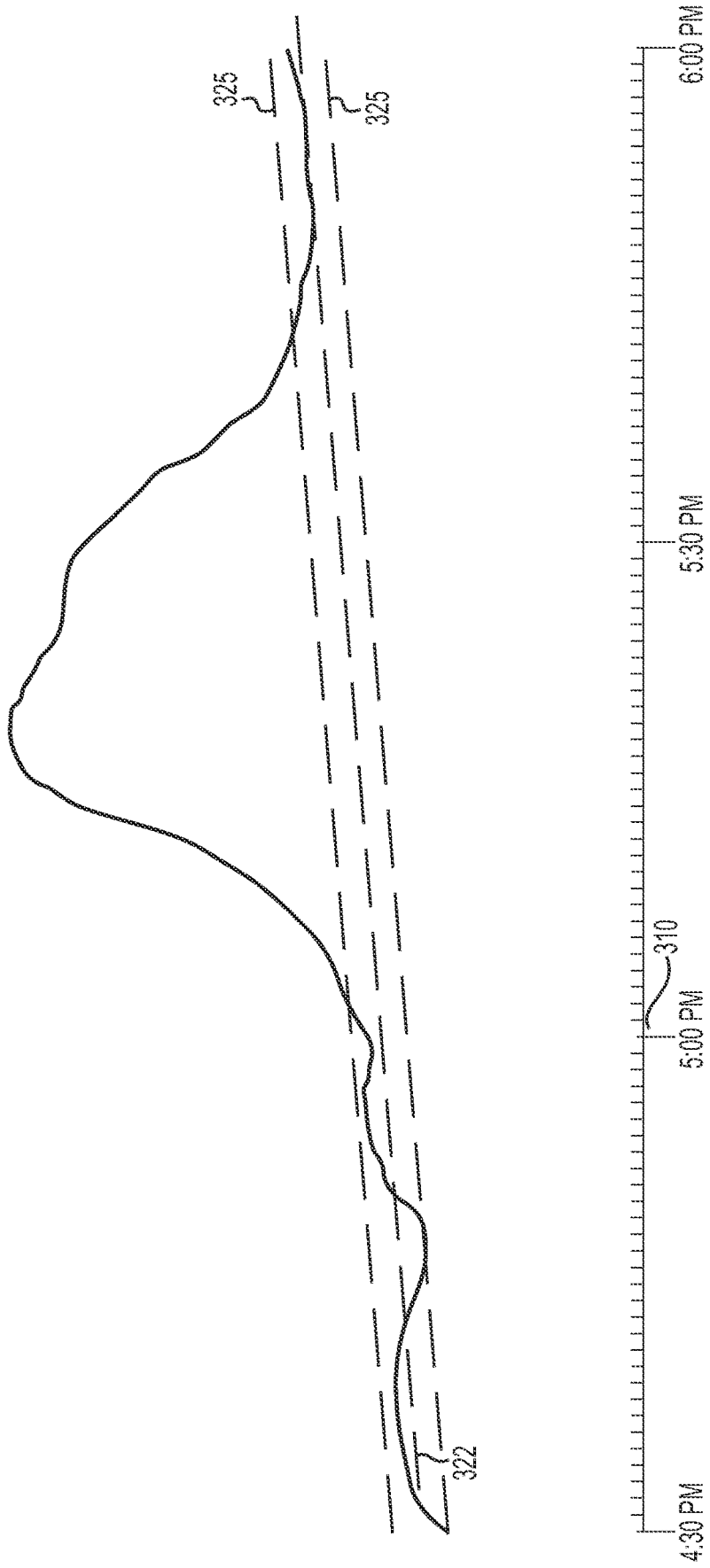
Figure 3F:
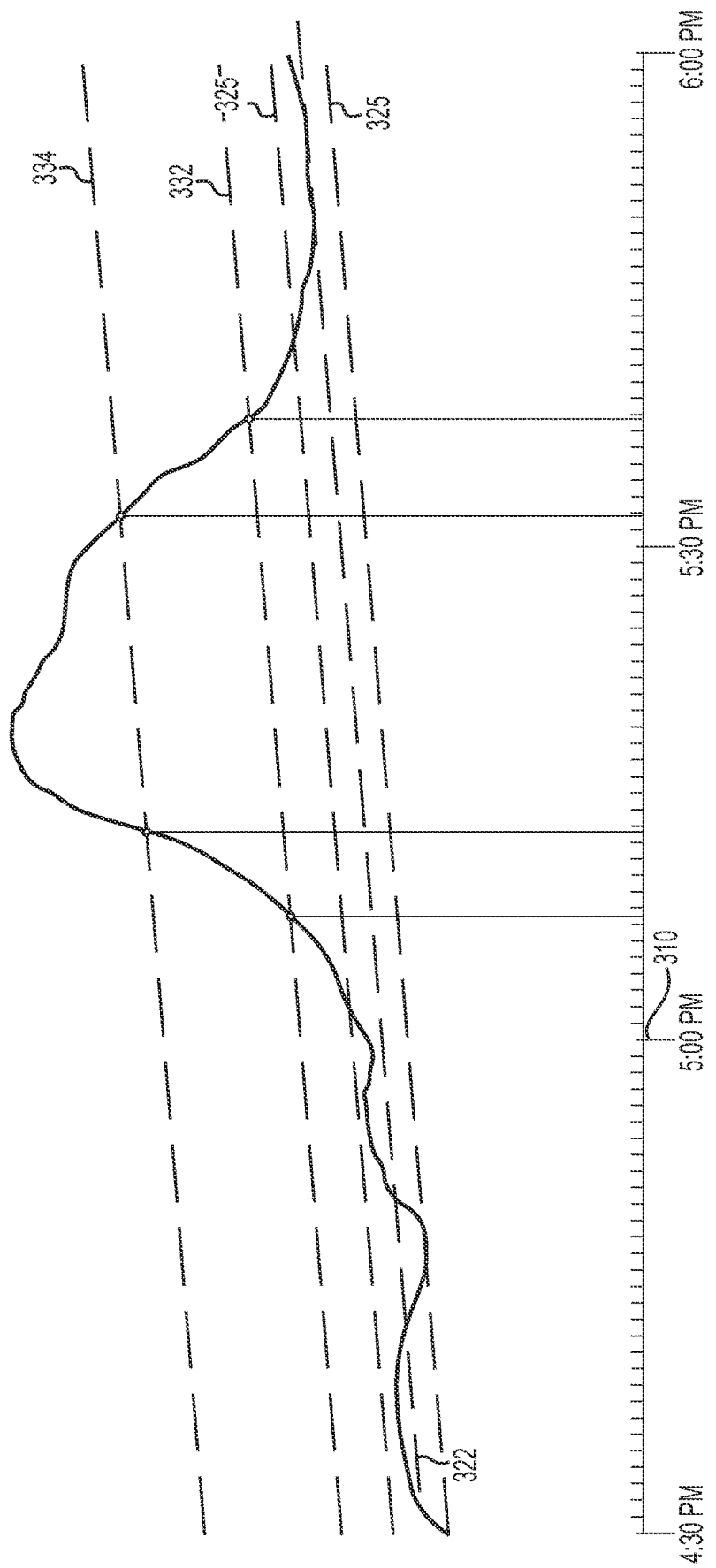

Once the traffic within shaded area 328 is disregarded, a modified variance may be calculated. Disregarding "outlier" data via step 212 may diminish any skewing of the data and/or skewing of the variance created by a spike in traffic and/or a peak. The modified variance 325 is illustrated in FIG. 3E. As shown in FIG. 3E, the modified variance 325 may be smaller than original variance 324 of FIG. 3D, since some of the data points within the peak have been removed from the calculation.

Once a modified variance is determined, it may be determined which discrete periods or bins of time are part of a peak in traffic. First, points of traffic data above the modified variance multiplied by a first threshold value may be determined (step 214). In some embodiments, the first threshold value may be one. In the example illustrated in FIG. 3F, the modified variance 325 multiplied by a first value is represented by low threshold line 332.

In step 216, points of traffic data above the modified variance multiplied by a second threshold value may be determined. In some embodiments, the second threshold value may be 3.5 and the variance may be the standard variation. In the example illustrated in FIG. 3F, the modified variance 325 multiplied by a second threshold value is represented by high threshold line 334.

Step 218 may include designating a duration of time as a peak using at least one of the points wherein the traffic data surpasses the modified variance multiplied by the first threshold value (e.g., above low threshold line 332) and points wherein the traffic data surpasses the modified variance multiplied by the second threshold value (e.g. above high threshold line 334). This period of time may be designated/calculated in any way. For example, one technique may to use a single threshold (i.e. a peak is designated when a point is greater than a value multiplied by a variance above the trend line).

Figure 3G:
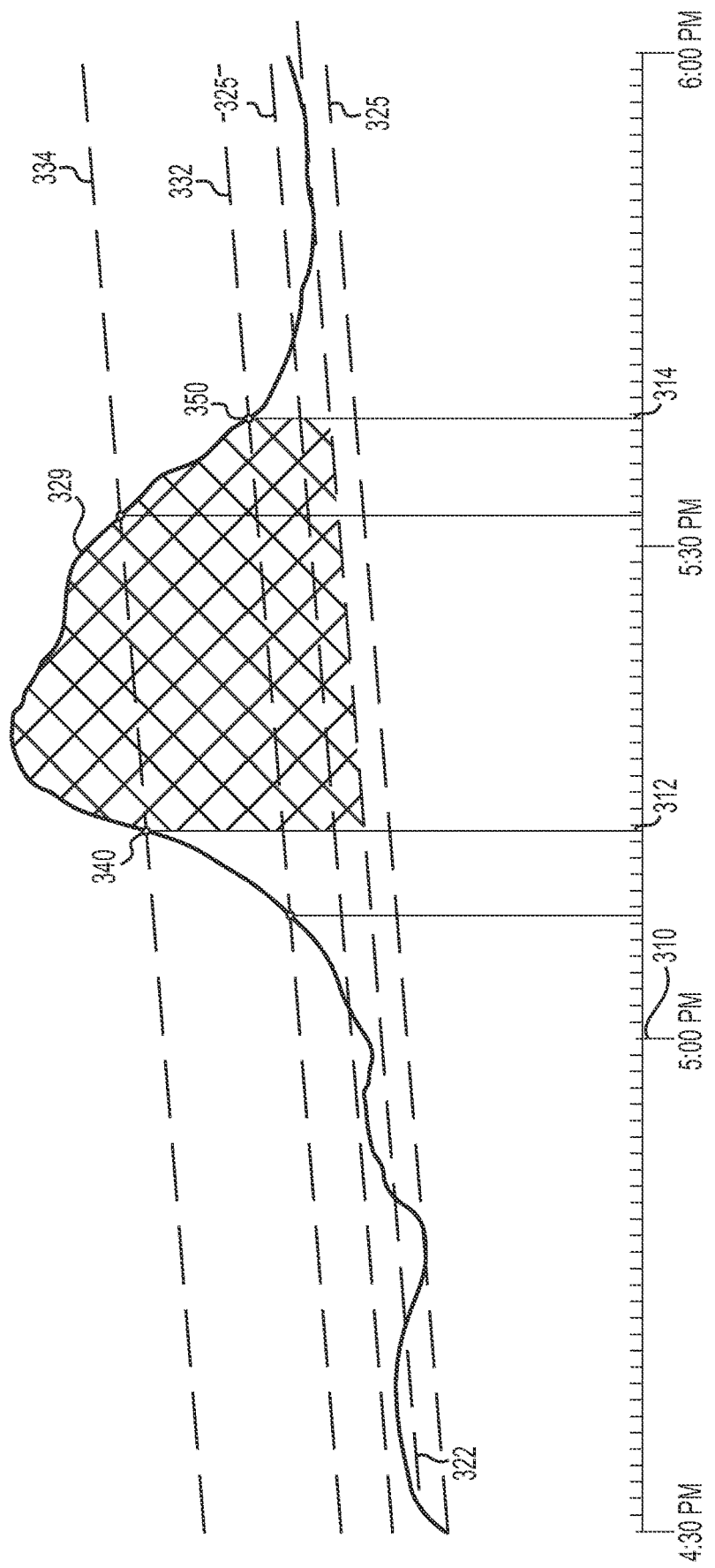

As shown in FIG. 3G, in one embodiment, the duration of time may be designated as peak by using the Schmitt trigger. Using the Schmitt trigger may provide for more accurate results than conventional solutions do, at least in part because it may capture both the tip and the base of the peak in traffic. In FIG. 3G, the duration of time designated as the peak 329 may begin when the traffic is above the high threshold line 334. In FIG. 3G, traffic is above the high threshold line 334 at traffic data point 340. Traffic data point 340 coincides with time 312 (e.g. approximately 5:13 pm). The duration of time designated as the peak 329 may end when the traffic is no longer above the low threshold line 332. In FIG. 3G, traffic is no longer above the low threshold line 332 at traffic data point 350. Traffic data point 350 coincides with time 314 (e.g. approximately 5:38 pm). Thus, in the example shown in FIG. 3G, the peak may be designated between 5:13 p.m. and 5:38 pm.

In step 220, the amount of the peak attributable to advertising spot 310 may be determined. Step 220 may include identifying the amount of traffic that is attributable to each advertising spot as the traffic data above the trend line within the duration of the peak. For this step, it may be assumed that half of the traffic is above the trend line and half the traffic is below the trend line. The additional traffic attributable to an advertising spot may be determined by calculating the area under the curve of peak 329 during the identified duration of the peak. Specifically, in the embodiment illustrated in FIG. 3G, the amount of traffic that may be attributed to advertising spot 310 may be the peak 329, represented by the shaded area above trend line 322 and between time 312 and time 314. For example, each mark on the y-axis may represent one visitor to the advertiser's web page(s) and each tick on the x-axis may represent a minute of time. By calculating the area of peak 329 (e.g., the section represented as the shaded area in FIG. 3G) the number of visitors attributable to advertising spot 310 may be determined. In one embodiment, the distance a point is from the trend line may be calculated as the orthogonal distance from the line as opposed to the vertical distance from the line to the point.

Figure 4:
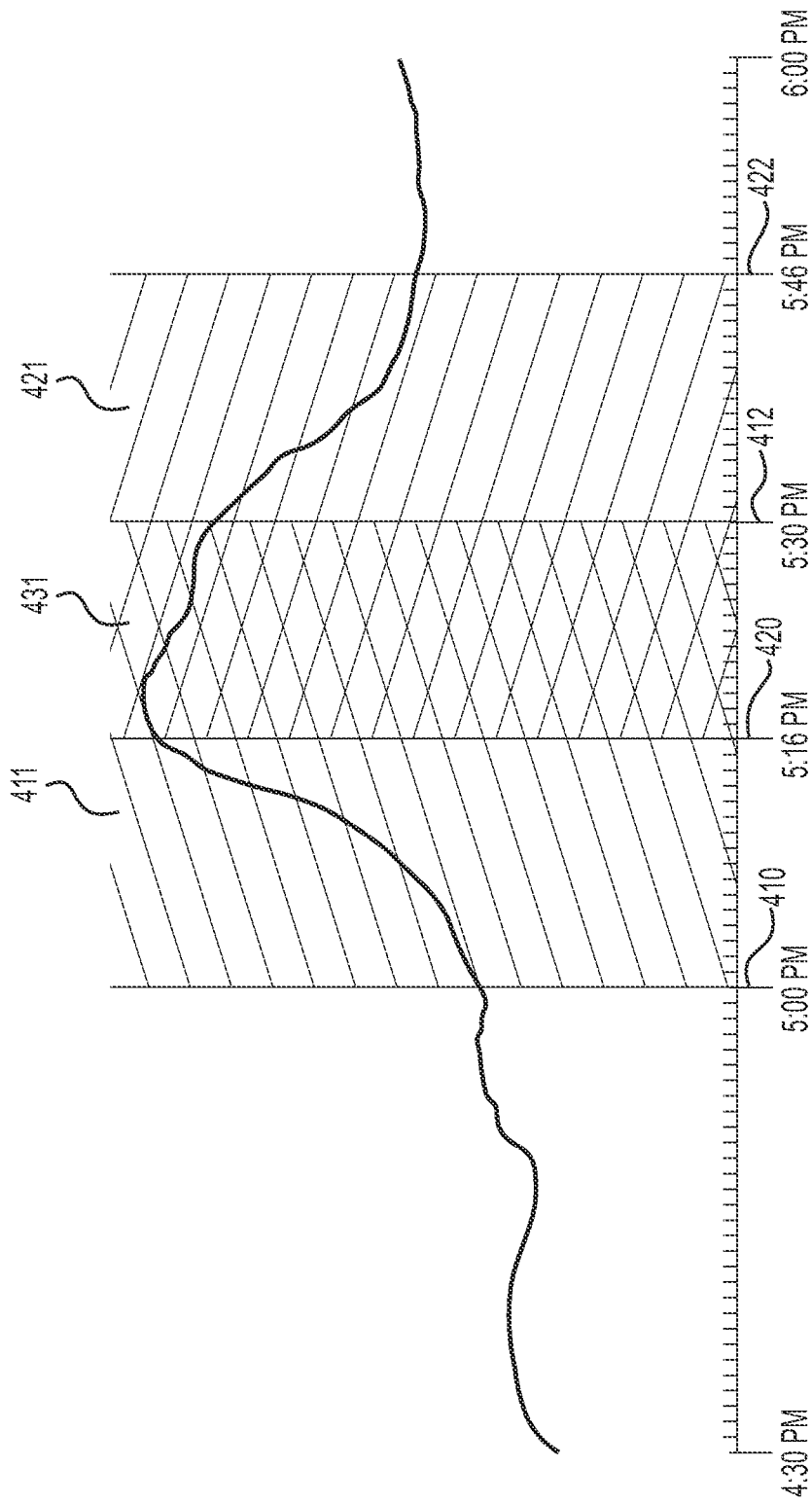
FIG. 4 is a graph of a number of visitors to a network location over time, the graph illustrating an airtime for two advertising sports with overlapping attribution time periods, according to some embodiments.

As described above, in some cases, advertising spots may air at similar times. In such situations, once a peak and the traffic within a peak is determined (e.g., as described with respect to FIGS. 3A-G above) the traffic within a peak may be apportioned between several advertising spots to thereby determine how much traffic is caused or influenced by each of the individual advertising spots. For example, as shown in FIG. 4, advertising spot 410 ran at 5:00 μm, and traffic to the advertiser's web page(s) is plotted within the 30 minutes preceding the spot (i.e., "baseline period") and 60 minutes following the spot (i.e., "measurement period"), thereby defining an entire period of interest from 4:30 p.m. to 6:00 pm (with each tick on the x-axis representing a minute). In some embodiments, each point on the graph may represent the number of visitors, views, new visitors, new member sign ups, and/or purchases in a minute.

As shown in FIG. 4, advertising spot 410 ran at 5:00 μm, and traffic to the advertiser's web page(s) is plotted with a 30 minute baseline period and a 60 minute measurement period, or from 4:30 p.m. to 6:00 pm (with each tick on the x-axis representing a minute). The length of the baseline period and measurement period may be determined or designated in any way, including, but not limited to, those described with respect to FIGS. 3A-G.

In order to determine how much of the web page traffic is attributable to advertising spot 410, an attribution period may be defined. An attribution period may be any time period after an adverting spot airs that the attribution company, advertising company, advertising agency, or any other party desires. This may be approximately 5 minutes to approximately one day after the advertising spot airs, in some cases between approximately 10 minutes and approximately 60 minutes. For example, because the width of a peak in traffic is typically not very long, attribution period 411 for advertising spot 410 of FIG. 4 may be approximately 30 minutes, spanning from advertising spot 410 at 5:00 pm to end of attribution period 412 at 5:30 μm. In some embodiments, the attribution period may not start immediately when the advertising spot airs. For example, the attribution period may start approximately 30 seconds after the spot airs to approximately 10 minutes after the advertising spot airs. This may be to account for the fact that it may take some time for consumers to finish watching the advertising spot, consider it, and/or access the Internet.

As shown in FIG. 4, advertising spot 420 ran at 5:16 pm. An attribution period 421 for advertising spot 420 may also span 30 minutes from the air time at 5:16 pm to the end of attribution period 422 at 5:46 pm. In this example, the attribution periods 411 and 421 overlap. The overlapping period 431 spans from 5:16 to 5:30, which is from the air time of advertising spot 420 to the end of attribution period 412 of advertising spot 410. In some embodiments, the traffic to be attributed to advertising spots during the overlapping period 431 would be divided between the two advertising spots. First, however, it may be determined which traffic data should be attributed to all advertising spots. The traffic data may be attributed to all advertising spots may be determined in any way known in the art. In some implementations, traffic data may be attributed to all advertising spots within the overlapping attribution period by identifying a peak, for example, as described below with respect to FIG. 5.

Referring now to FIG. 7, a table is depicted showing that exemplary spots 1 and 2 (corresponding to advertising spot 410 and 420 of FIG. 4) have overlapping attribution periods (e.g., they aired within 30 minutes of each other at 5:00 μm and 5:16 pm). Thus, the traffic to the advertiser's web page(s) may be plotted from 5:00 pm to 6:00 pm (e.g., the measurement period for spot 1) and the attribution periods 411 and 421 may represented on the graph. The traffic to be attributed to all advertising spots within the overlapping period of spots 410 and 420 (e.g, overlapping period 431 of FIG. 4) may be divided between the two spots.

Figure 5:
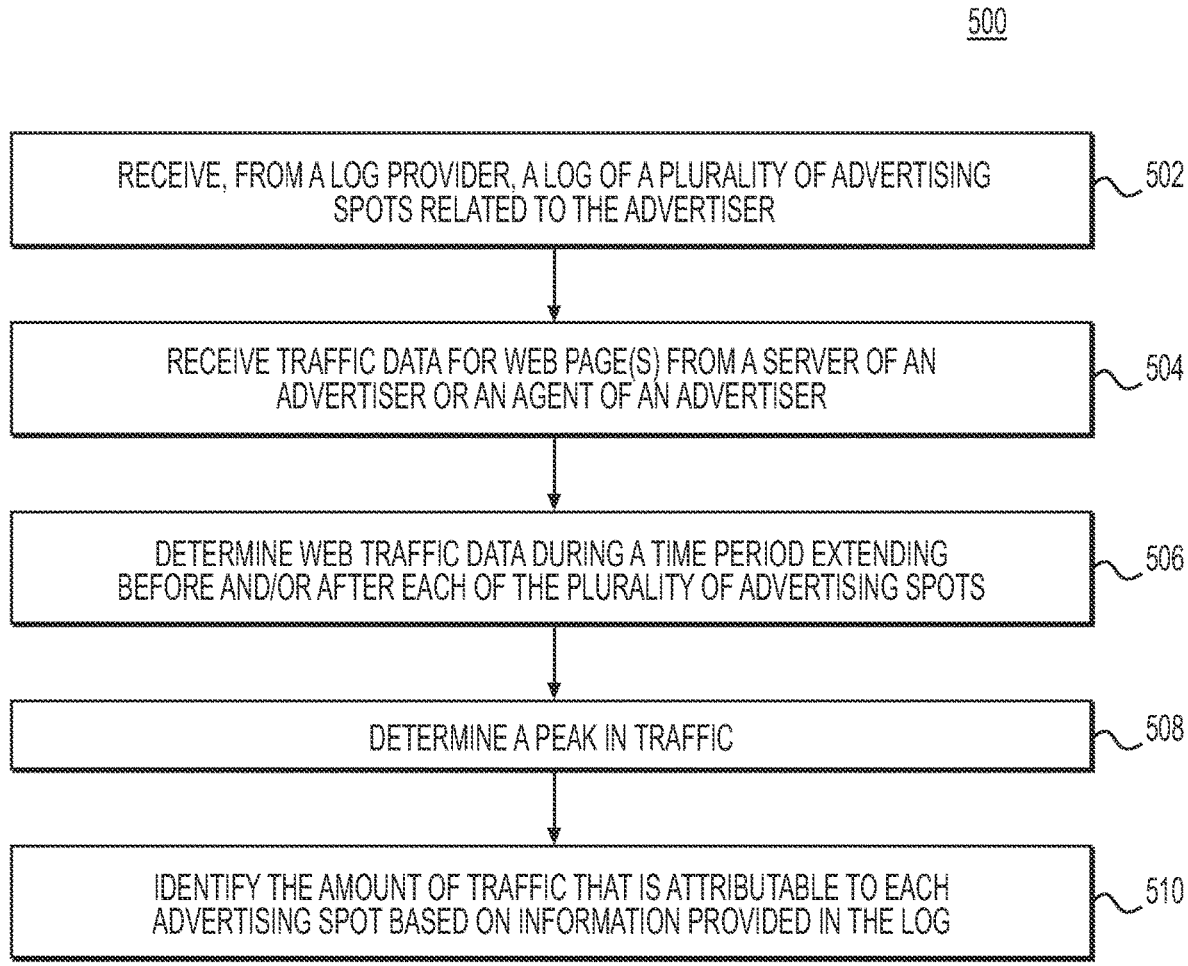
FIG. 5 is a block diagram of an exemplary process for identifying the amount of web page traffic attributable to each of several advertising spots according to some embodiments.

FIG. 5 is a process flow diagram of an exemplary method 500 for attributing web traffic to each of a plurality of advertisement spots that aired at similar times. For purposes of discussion, method 500 will be described using environment 100 of FIG. 1, log 700 of FIG. 7, and the graphical representations of FIGS. 3G, 4, and 8 but method 500 is not intended to be limited thereto. As shown in FIG. 5, method 500 includes steps 502, 504, 506, 508, and 510. However, it should be noted that method 500 may include more or fewer steps as desired for a particular implementation and the steps may be performed in any order. In an example, one or more of the above-listed steps of method 500 may be executed by advertisement module 130, attribution module 132, and/or online module 134 of FIG. 1, as described above. However, method 500 is not intended to be limited thereto, and the steps of method 500 may be performed by any party, module, and/or server (e.g., log provider 120, advertiser web server 140, and/or advertiser mobile server 142) or other type of computing device having at least one processor, a memory, and a network communication interface for sending and receiving information from one or more user devices.

Method 500 may begin in step 502, which may include receiving, e.g., from a log provider, a log of a plurality of advertising spots related to the advertiser. For example, advertisement module 130 may receive a log from log provider 120 of FIG. 1. The log may include any information related to the advertising spots, including, but not limited to, which agency purchased the advertisement spot, the network that ran the spot, the program the spot ran during, the time the spot ran, the length of the spot, the cost of the spot, the creative aspects of the spot, the audience size that viewed the program that the spot ran during, and/or the market the spot ran in (e.g., national television, local television, radio, etc.). In some implementations, the cost and/or the average cost of all advertising spots for a particular marketing channel may be provided (e.g., not limited to the advertising spots purchased by or related to the advertiser). In some implementations, attribution module 132 of FIG. 1 may receive log 700 of FIG. 7. In some embodiments, advertisement module 130 may track advertising spots and create a log itself.

Step 504 may include receiving traffic data for web page(s) from a server of an advertiser or an agent of an advertiser. For example, in FIG. 1, online module 134 and/or attribution module 132 may receive, from advertiser web server 140 and/or advertiser mobile server 142, traffic data for an advertiser's web page(s) and/or client applications. In the example shown in FIG. 1, online module 134 and advertisement module 130 may provide to attribution module 132 data related to traffic on the advertiser's web page(s) and data related to a plurality of advertising spots, respectively.

Figure 8:
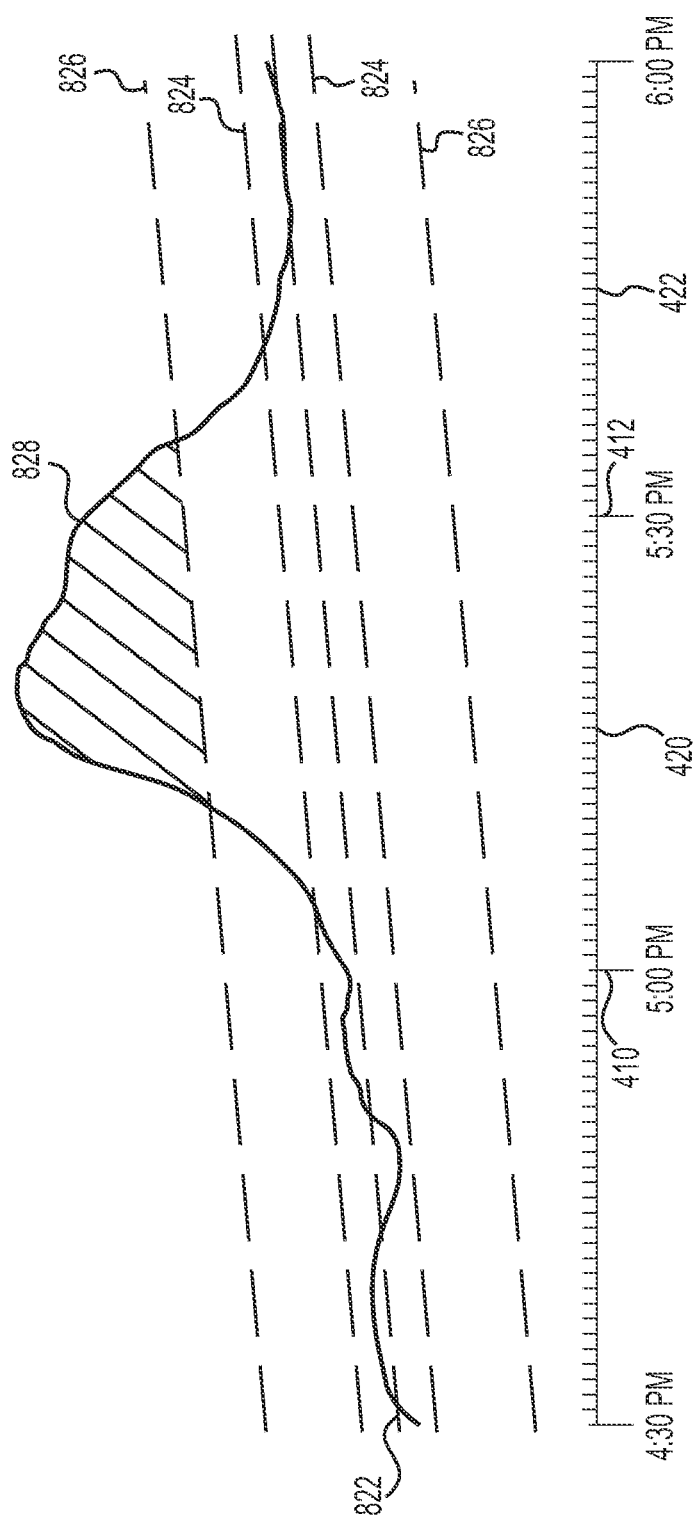
FIG. 8 is a graph of a number of visitors to a network location over time, the graph illustrating a baseline time period and a measurement time period for evaluating the effectiveness of offline advertisements in driving online activity according to some embodiments.

In step 506, attribution module 132 may determine web traffic data during a time period extending before (e.g., a baseline period) and/or after (e.g., a measurement period) each of the plurality of advertising spots. As shown in FIGS. 4 and 8, attribution module 132 may generate a graphical representation of the, e.g., 30 minutes prior to and 60 minutes after advertising spot 410 airs on television and/or the radio. Additionally or alternatively, the attribution period 411 of advertising spot 410 may be generated on the graphical representation. Any advertising spots that aired during attribution period 411 of advertising spot 410 (e.g., advertising spot 420) may be displayed on the graphical representation, along with the attribution period 421 of said advertising spot 420.

Method 500 may then proceed to step 508. In step 508, a peak in traffic may be determined. The peak may be determined in any way known in the art. In some implementations, a peak may be determined, for example, as illustrated in FIG. 8. For example, trend line 822 may be fit to the determined traffic data using a variety of techniques. The standard deviation 824 from trend line 822, and a threshold value multiplied by the standard deviation (e.g., line 826), may be determined. All traffic above the threshold value multiplied by the standard deviation (e.g., line 826) may be designated as the peak (e.g., the shaded area 828).

In another implementation, a peak in web traffic may be determined in the way described above and illustrated in FIGS. 3A-G.

Once a peak in web traffic is determined, method 500 may proceed to step 510, for identifying the amount of traffic that is attributable to each advertising spot based on information provided in the log (e.g., log 700 of FIG. 7). The amount of traffic that is attributable to each advertising spot may be identified in any way. In some implementations, method 600 of FIG. 6 may be performed as step 510 of method 500.

Figure 6:
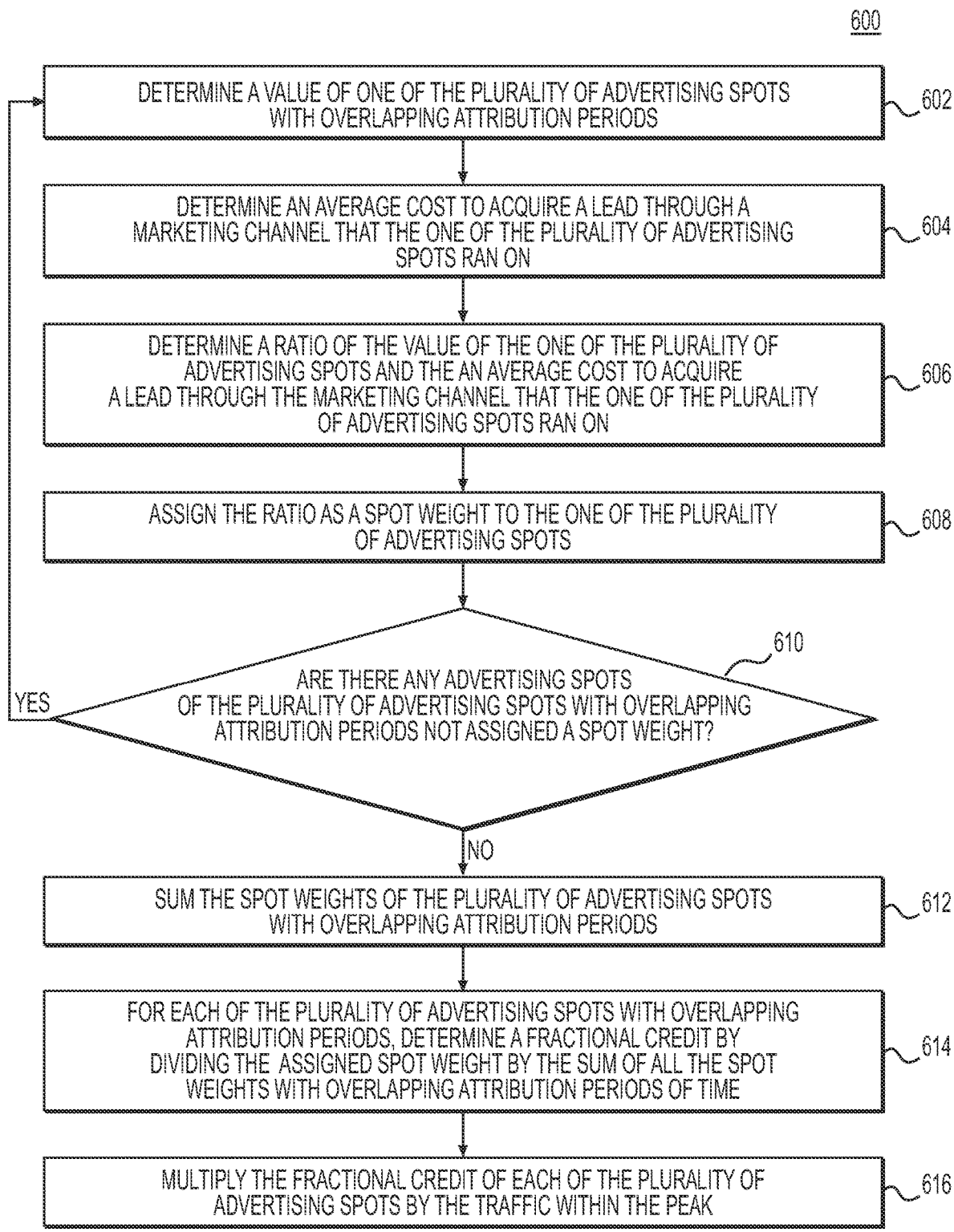
FIG. 6 is a block diagram of an exemplary process for dividing the amount of web page traffic attributable to advertising spots between a plurality of advertising spots, according to some embodiments.

FIG. 6 is a process flow diagram of an exemplary method 600 for attributing a peak in web traffic to each of a plurality of advertisement spots. For purposes of discussion, method 600 will be described using environment 100 of FIG. 1 and log 700 of FIG. 7, but method 600 is not intended to be limited thereto. As shown in FIG. 6, method 600 includes steps 602, 604, 606, 608, 610, 612, 614, and 616. However, it should be noted that method 600 may include more or fewer steps as desired for a particular implementation, and the steps may be performed in any order. In an example, one or more of the above-listed steps of method 600 may be executed by advertisement module 130, attribution module 132, and/or online module 134 of FIG. 1, as described above. However, method 600 is not intended to be limited thereto, and the steps of method 600 may be performed by any party, module, and/or server (e.g., log provider 120, advertiser web server 140, and/or advertiser mobile server 142) or other type of computing device having at least one processor, a memory, and a network communication interface for sending and receiving information from one or more user devices. For exemplary purposes only, a hypothetical will be used to describe method 600. In this hypothetical, the attribution period is 30 minutes and data related to spot 1 of log 700 will be used for the first iteration through steps 602, 604, 606, 608, and 610.

Method 600 may begin at step 602, which may include determining a value of one of the plurality of advertising spots with overlapping attribution periods. An attribution period may be determined at the discretion of the advertiser, the discretion of the attribution system/company, randomly assigned, and/or as needed for a desired implementation. For example, if the attribution period is 30 minutes, then spots 1, 2, and 3 of log 700 would have overlapping attribution periods (e.g., spots 2 and 3 aired within 30 minutes of spot 1).

In one embodiment, advertising spots may be weighted according to any value or parameter associated with each advertising spot. In the example illustrated in log 700, a value may be related to the cost of the spot, the network, the marketing channel, the program, the length of the spot, the audience size (e.g., as determined by Nielsen), the purchasing agency, and/or a creative aspect. For example, it may be assumed that more traffic will result from an advertising spot that ran longer, that ran nationally as opposed to locally, or that had a larger audience size. A spot with such characteristics may thus be assigned a greater value. In some implementations, advertising spots may be assigned a value based a combination of factors, including, but not limited, those factors illustrated in log 700 of FIG. 7.

In some embodiments, advertising spots may illustrate a strong, and near linear, relationship between the cost of the spot and the size of the peak. Thus, for the purposes of this disclosure, method 600 will be described using the cost of the advertising spot as the value determined in step 602. In the hypothetical used above, since the attribution period is 30 minutes and spots 2 and 3 aired within 30 minutes of spot 1, step 602 would determine the cost of spot 1 in the first iteration and then spots 2 and 3 (e.g., 20 for spot 1, 10 for spot 2, and 15 for spot 3).

In step 604, an average cost to acquire a lead (e.g., pay per click, organic search, direct, conversions, etc.) through a marketing channel that the one of the plurality of advertising spots ran on. For example, if in step 602, the value for spot 1 was determined, the average cost to acquire a lead through national television would be determined in step 304. The average cost to acquire a lead through a marketing channel may be determined and/or estimated in any way. For example, this cost may be determined in the manner described the U.S. Patent Application entitled "Systems and Methods for Attributing Online Events to Certain Advertising Efforts," (U.S. application Ser. No. 14/610,867) filed by inventor Mark Eberstein on Jan. 30, 2015 or derived from values determined in the same application. For example, using the method disclosed in the above-referenced application, the number of leads caused by the daily spend on advertising spots on a networking channel may be determined. Using that number and the daily spend on advertising spots (e.g., as communicated by log provider 120, advertiser web server 140 and/or advertiser mobile server 142), the average cost to acquire each lead may be determined.

In one example, $200 may have been spent on national television advertising on April 5th and it may be determined (e.g., through the methods described in the above-referenced application), that the advertising on national television for April $5^{th}$ resulted in 10 leads. The cost per lead for the national television advertising on April $5^{th}$ would be $20/lead. Using similar methods, it may be determined that the cost per lead from April $4^{th}$ was $15. Thus, in the example shown in FIG. 7, the average cost per lead for the marketing channel that the one of the plurality of advertising spot from step 602 ran on (e.g., national television) is $17.50.

Step 606 includes determining a ratio of the value of the one of the plurality of advertising spots to the average cost per lead for the marketing channel that the one of the plurality of advertising spots ran on. In other words, step 606 may include determining a ratio of the value determined in step 602 to the average value determined in step 604.

An example of a formula that may be used in step 606 of method 600 to determine the ratio of the value of the one of the plurality of advertising spots to the average value cost per lead for the marketing channel that the one of the plurality of advertising spots ran on, as described above, is illustrated by equation (1) provided below:

$$\text{Spot\_Weight} = \frac{(\text{Spot\_cost} + 1)}{(\text{Channel\_CPL} + 1)} \quad (1)$$

where the variable "Spot_cost" may represent the value determined in step 602, and the variable "Channel_CPL" may represent a channel's cost per lead (e.g., the average cost per lead for the marketing channel). In the hypothetical described above, the Spot_cost of advertising spot 1 is 20 and the Channel_cost per lead for national television, which ran advertising spot 1 is 17.5 (i.e., the average of 15 and 20). Thus, the spot weight for spot 1 would be a ratio of 21 to 18.5, which translates to a spot weight of approximately 1.135 (i.e., 21 divided by 18.5). It should be noted that the spot weight may be stored in any form, including, but not limited to, any fraction, decimal, integer, grade, or any other value appropriate for a particular implementation. In step 608, the ratio determined in step 606 may be assigned to the one of the plurality of advertising spots as a "spot weight." In the hypothetical used herein, the advertising spot 1 of FIG. 7 may be assigned a spot weight of 1.135.

In step 610, it may be determined whether there are any advertising spots within the attribution period of the one of the plurality of spots (e.g., spots with overlapping attribution periods) that have not been assigned a spot weight. If there are any advertising spots with overlapping attribution periods not assigned a spot weight (step 610: Yes), method 600 may proceed to step 602 to determine a value for any advertising spot that has not yet been assigned a spot weight. In the hypothetical used above, the attribution period is 30 minutes, and thus spots 1, 2, and 3 of FIG. 7 have overlapping attribution periods. If any of spots 1, 2, and 3 is not assigned a spot weight, method 600 will proceed to step 602 for those spot(s) without a spot weight. In the hypothetical in which spot 1 is used for the first iteration of steps 602, 604, 606, 608, and 610, these steps may be performed again for spots 2 and 3, which, for purposes of this example, would result in a spot weight of 0.759 for spot 2 and 1.0 for spot 3.

If all advertising spots with overlapping attribution periods are assigned a spot weight (step 610: No), method 600 may proceed to step 612. In the example described above, once spots 1, 2, and 3 are assigned spot weights (e.g., 1.135 for spot 1; 0.759 for spot 2; and 1.0 for spot 3) method 600 may proceed to step 612.

Step 612 may include calculating the sum of the spot weights of the plurality of advertising spots with overlapping attribution periods. In the hypothetical described above, the sum of the values for spots 1, 2, and 3 is 2.894. In step 614, for each of the plurality of advertising spots with overlapping attribution periods, a fractional credit may be determined by dividing the assigned spot weight by the sum of all the spot weights for advertising spots with overlapping attribution periods (e.g., the sum calculated in step 612). In the hypothetical described above, in step 614 for each of spots 1, 2, and 3 (spots that ran within 30 minutes of each other), a fractional credit may be determined. For spot 1, this fractional credit may be determined by dividing the spot weight for spot 1 (e.g., 1.135) by the sum of the spot weights for spots 1, 2, and 3 as determined in step 612 (e.g., 2.894).

An example of a formula that may be used in step 614 of method 600 to determine a fractional credit by dividing the assigned spot weight of each advertising spot by the sum of all the spot weights, as described above, is illustrated by equation (2) provided below:

$$\text{Fractional\_Credit} = \frac{\text{Spot\_Weight}}{\text{Sum(Spot\_Weights)}} \quad (2)$$

In the hypothetical described above, the spot weight of advertising spot 1 is 1.135, and the sum of the spot weights of spots 1, 2, and 3, which ran within 30 seconds of each other, is 2.894. Thus, the fractional credit for spot 1 would be approximately 0.392.

In step 616, the fractional credit of each of the plurality of advertising spots may be multiplied by the traffic within the peak. For example, if it was determined in step 208 that attributable to any advertising spot is 1000 additional visits to the advertiser's web page(s) that occurred during one of the minute bins within the overlapping attribution period of spots 1, 2, and 3 (e.g., 5:26 pm), then in step 616 of method 600, the amount of traffic attributable to spot 1 for that minute may be 392 (e.g., a fractional credit of 0.392 for spot 1 multiplied by the total traffic attributed to the peak, i.e., the advertising spots that ran within 30 seconds of each other).

The above described method may, thus, advantageously use data related to a plurality of advertising spots to determine an amount of online traffic attributable to each advertising spot. Unlike conventional solutions, the above method may attribute some fraction of a web peak to each of multiple advertising spots even when these spots aired at similar times (i.e., in circumstances where the usual time-based indicators are irrelevant). By using quantitative values associated with an advertising spot (e.g., the cost to air the advertising spot) it may therefore be possible to effectively attribute credit to each of the plurality of advertising spots and calculate the amount of web traffic to attribute to each advertising spot (e.g., based on the spot's weight and fractional credit as a function of the cost to acquire a lead through a marketing channel), thereby, correlating the size of a peak in online traffic with the cost of advertising in the spot of interest.

Figure 9:
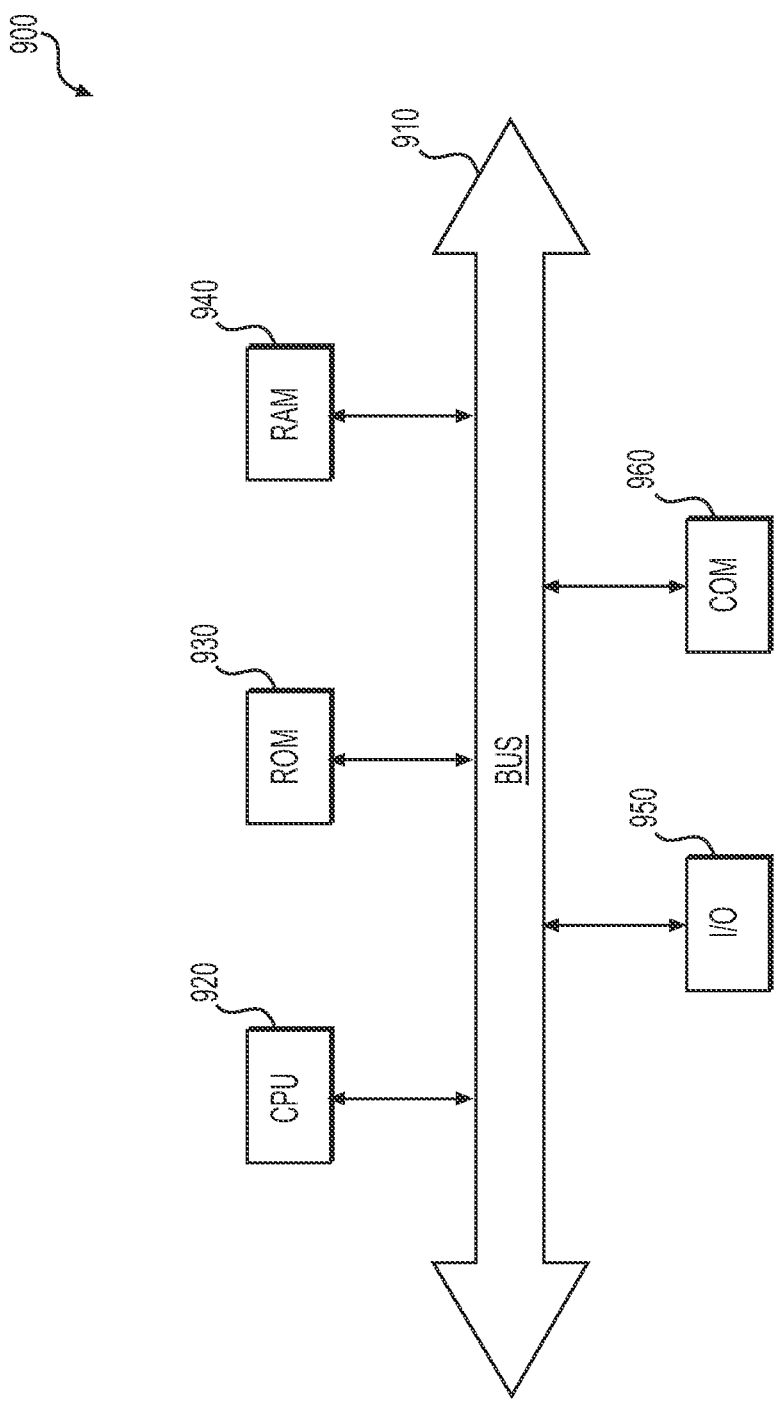
FIG. 9 is a block diagram of an exemplary computer system in which embodiments of the present disclosure may be implemented.

FIG. 9 provides a high-level functional block diagram illustrating an exemplary computer 900. Computer 900 may be used to implement, for example, any of log provider 120, advertiser web server 140, advertiser mobile server 142, advertisement module 130, attribution module 132, online module 134 and advertiser output 136 of FIG. 1, as described above. It is believed that those skilled in the art are familiar with the structure, programming and general operation of such computer equipment and as a result the drawings should be self-explanatory.

In an example, computer 900 may represent a computer hardware platform for a server or the like. Accordingly, computer 900 may include, for example, a data communication interface for packet data communication 960. The platform may also include a central processing unit (CPU) 920, in the form of one or more processors, for executing program instructions. The platform typically includes an internal communication bus 910, program storage and data storage for various data files to be processed and/or communicated by the platform such as ROM 930 and RAM 940, although the computer 900 often receives programming and data via network communications 970. The hardware elements, operating systems and programming languages of such equipment are conventional in nature, and it is presumed that those skilled in the art are adequately familiar therewith. Computer 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the user device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for attributing web traffic to a corresponding media content item, the method comprising:

receiving web data from a server associated with a media content item provider;

accessing web traffic data from the web data during a time period extending at least before and after one of the plurality of media content items;

determining a variance from a trend line fit to the web traffic data;
disregarding web traffic data above a first value multiplied by the determined variance to determine a modified variance from the trend line;
designating a duration of time as a peak based on the modified variance, the peak beginning at the time when traffic data is above a high threshold line determined by multiplying the modified variance by a second value, and the peak ending at the time when traffic data is no longer above a low threshold line determined by multiplying the modified variance by a third value; and
identifying an amount of traffic that is attributable to the one of the plurality of media content items as the traffic data within the duration of the peak.

2. The method of claim 1, wherein designating a duration of time as a peak further comprises:
determining at least one of points of traffic data above the modified variance multiplied by a first threshold value and points of traffic data above the modified variance multiplied by a second threshold value.

3. The method of claim 2, wherein the designating a duration of time as a peak further comprises:
applying a Schmitt trigger, wherein the modified variance multiplied by the first threshold value is a low threshold and the modified variance multiplied by the second threshold value is a high threshold.

4. The method of claim 3, wherein the first threshold value is 1 and the second threshold value is 3.5.

5. The method of claim 1, further comprising:
iteratively determining the variance from the trend line fit to the determined web traffic data.

6. The method of claim 1, wherein the value is 3.5.

7. The method of claim 1, wherein identifying the amount of traffic that is attributable to the one of the plurality of media content items further comprises:
measuring an orthogonal distance between the trend line and an x-axis.

8. The method of claim 1, wherein the time period extending at least one of before and after one of the plurality of media content items includes 30 minutes before and 60 minutes after the one of the plurality of media content items.

9. A computer system for evaluating user input relating to electronic published content, the computer system having a data storage device storing instructions for evaluating user input relating to electronic published content and a processor configured to execute the instructions stored on the data storage device for executing a series of steps, the steps comprising:
receiving web data from a server associated with a media content item provider;
accessing web traffic data from the web data during a time period extending at least before and after one of the plurality of media content items;
determining a variance from a trend line fit to the web traffic data;
disregarding web traffic data above a first value multiplied by the determined variance to determine a modified variance from the trend line;
designating a duration of time as a peak based on the modified variance, the peak beginning at the time when traffic data is above a high threshold line determined by multiplying the modified variance by a second value, and the peak ending at the time when traffic data is no longer above a low threshold line determined by multiplying the modified variance by a third value; and
identifying an amount of traffic that is attributable to the one of the plurality of media content items as the traffic data within the duration of the peak.

10. The system of claim 9, wherein designating a duration of time as a peak further comprises:
determining at least one of points of traffic data above the modified variance multiplied by a first threshold value and points of traffic data above the modified variance multiplied by a second threshold value.

11. The system of claim 10, wherein the designating a duration of time as a peak further comprises:
applying a Schmitt trigger, wherein the modified variance multiplied by the first threshold value is a low threshold and the modified variance multiplied by the second threshold value is a high threshold.

12. The system of claim 11, wherein the first threshold value is 1 and the second threshold value is 3.5.

13. The system of claim 9, further comprising:
iteratively determining the variance from the trend line fit to the determined web traffic data.

14. The system of claim 9, wherein the value is 3.5.

15. The system of claim 9, wherein identifying the amount of traffic that is attributable to the one of the plurality of media content items further comprises:
measuring an orthogonal distance between the trend line and an x-axis.

16. The system of claim 9, wherein the time period extending at least one of before and after one of the plurality of media content items includes 30 minutes before and 60 minutes after the one of the plurality of media content items.

17. A non-transitory computer-readable medium storing instructions that, when executed by a computer system, cause the computer system to perform a method, the method comprising:
receiving web data from a server associated with a media content item provider;
accessing web traffic data from the web data during a time period extending at least before and after one of the plurality of media content items;
determining a variance from a trend line fit to the web traffic data;
disregarding web traffic data above a first value multiplied by the determined variance to determine a modified variance from the trend line;
designating a duration of time as a peak based on the modified variance, the peak beginning at the time when traffic data is above a high threshold line determined by multiplying the modified variance by a second value, and the peak ending at the time when traffic data is no longer above a low threshold line determined by multiplying the modified variance by a third value; and
identifying an amount of traffic that is attributable to the one of the plurality of media content items as the traffic data within the duration of the peak.

18. The non-transitory computer-readable medium of claim 17, wherein designating a duration of time as a peak further comprises:
determining at least one of points of traffic data above the modified variance multiplied by a first threshold value and points of traffic data above the modified variance multiplied by a second threshold value.

19. The non-transitory computer-readable medium of claim 18, wherein the designating a duration of time as a peak further comprises:
applying a Schmitt trigger, wherein the modified variance multiplied by the first threshold value is a low threshold and the modified variance multiplied by the second threshold value is a high threshold.

20. The non-transitory computer-readable medium of claim 17, wherein the time period extending at least one of before and after one of the plurality of media content items includes 30 minutes before and 60 minutes after the one of the plurality of media content items.

* * * * *